(12) United States Patent
Fujiwara et al.

(10) Patent No.: US 12,554,091 B2
(45) Date of Patent: Feb. 17, 2026

(54) LENS MOUNT AND LENS APPARATUS HAVING THE SAME

(71) Applicant: CANON KABUSHIKI KAISHA, Tokyo (JP)

(72) Inventors: Yusuke Fujiwara, Tokyo (JP); Taro Murakami, Tokyo (JP); Kiyoshi Nitto, Saitama (JP); Yosuke Fukai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 350 days.

(21) Appl. No.: 18/183,990

(22) Filed: Mar. 15, 2023

(65) Prior Publication Data

US 2023/0305260 A1    Sep. 28, 2023

(30) Foreign Application Priority Data

Mar. 23, 2022  (JP) ................................ 2022-046371

(51) Int. Cl.
*G02B 7/00* (2021.01)
*G02B 7/14* (2021.01)
*G03B 35/08* (2021.01)

(52) U.S. Cl.
CPC ............... *G02B 7/006* (2013.01); *G02B 7/14* (2013.01); *G03B 35/08* (2013.01)

(58) Field of Classification Search
CPC ........... G02B 7/006; G02B 7/14; G03B 35/08
See application file for complete search history.

(56) References Cited

U.S. PATENT DOCUMENTS

2018/0027152 A1*  1/2018  Sheridan .............. H04N 13/239
                                                              348/47
2022/0400194 A1* 12/2022  Ito .......................... G03B 17/14

FOREIGN PATENT DOCUMENTS

| JP | 2005215082 A | 8/2005 |
|----|--------------|--------|
| JP | 2014109739 A | 6/2014 |
| JP | 2014145969 A | 8/2014 |
| JP | 2020-067575 A | 4/2020 |
| JP | 2021029042 A | 2/2021 |
| JP | 2021056394 A | 4/2021 |

OTHER PUBLICATIONS

The above foreign patent documents were cited in the Nov. 25, 2025 Japanese Office Action, which is enclosed without an English Translation, that issued in Japanese Patent Application No. 2022046371.

* cited by examiner

*Primary Examiner* — James C. Jones
(74) *Attorney, Agent, or Firm* — Cowan, Liebowitz & Latman, P.C.

(57) ABSTRACT

A lens mount is configured to enable a lens apparatus that includes a first optical system and a second optical system to be attached to and detached from an image pickup apparatus. The lens mount includes a cover member having a first opening for the first optical system and a second opening for the second optical system, and a filter member movable between a first state in which the filter member retreats from the first opening and the second opening and a second state in which the filter member enters the first opening and the second opening. The filter member becomes in the first state by simultaneously retreating from the first opening and the second opening, and becomes in the second state by simultaneously entering the first opening and the second opening.

7 Claims, 19 Drawing Sheets

LENS MOUNT AND LENS APPARATUS HAVING THE SAME

BACKGROUND

Technical Field

One of the aspects of the disclosure relates to a lens mount and a lens apparatus having the same.

Description of the Related Art

An interchangeable lens for stereoscopic imaging has conventionally been known that includes two optical systems arranged in parallel and configured to form two parallel image circles on an imaging plane of a single image sensor.

A structure is also known that attaches filters to a side closest to the object of an interchangeable lens. Japanese Patent Laid-Open No. 2020-67575 discloses a structure that attaches filters via bayonet portions to openings on an attached side of an interchangeable lens.

Interchangeable lenses for stereoscopic imaging have two openings, and the filters need to simultaneously close these two apertures. Otherwise, left and right exposure correcting timings shift, and the image quality may deteriorate. However, Japanese Patent Laid-Open No. 2020-67575 is silent about a configuration for solving this problem.

SUMMARY

One of the aspects of the embodiment provides a lens mount that allows filters to be simultaneously retracted from and inserted into two openings.

A lens mount according to one aspect of the disclosure is configured to enable a lens apparatus that includes a first optical system and a second optical system to be attached to and detached from an image pickup apparatus. The lens mount includes a cover member having a first opening for the first optical system and a second opening for the second optical system, and a filter member movable between a first state in which the filter member retreats from the first opening and the second opening and a second state in which the filter member enters the first opening and the second opening. The filter member becomes in the first state by simultaneously retreating from the first opening and the second opening, and becomes in the second state by simultaneously entering the first opening and the second opening. A lens apparatus having the above lens mount also constitutes another aspect of the disclosure.

Further features of the disclosure will become apparent from the following description of embodiments with reference to the attached drawings.

DESCRIPTION OF THE EMBODIMENTS

Figure 1:
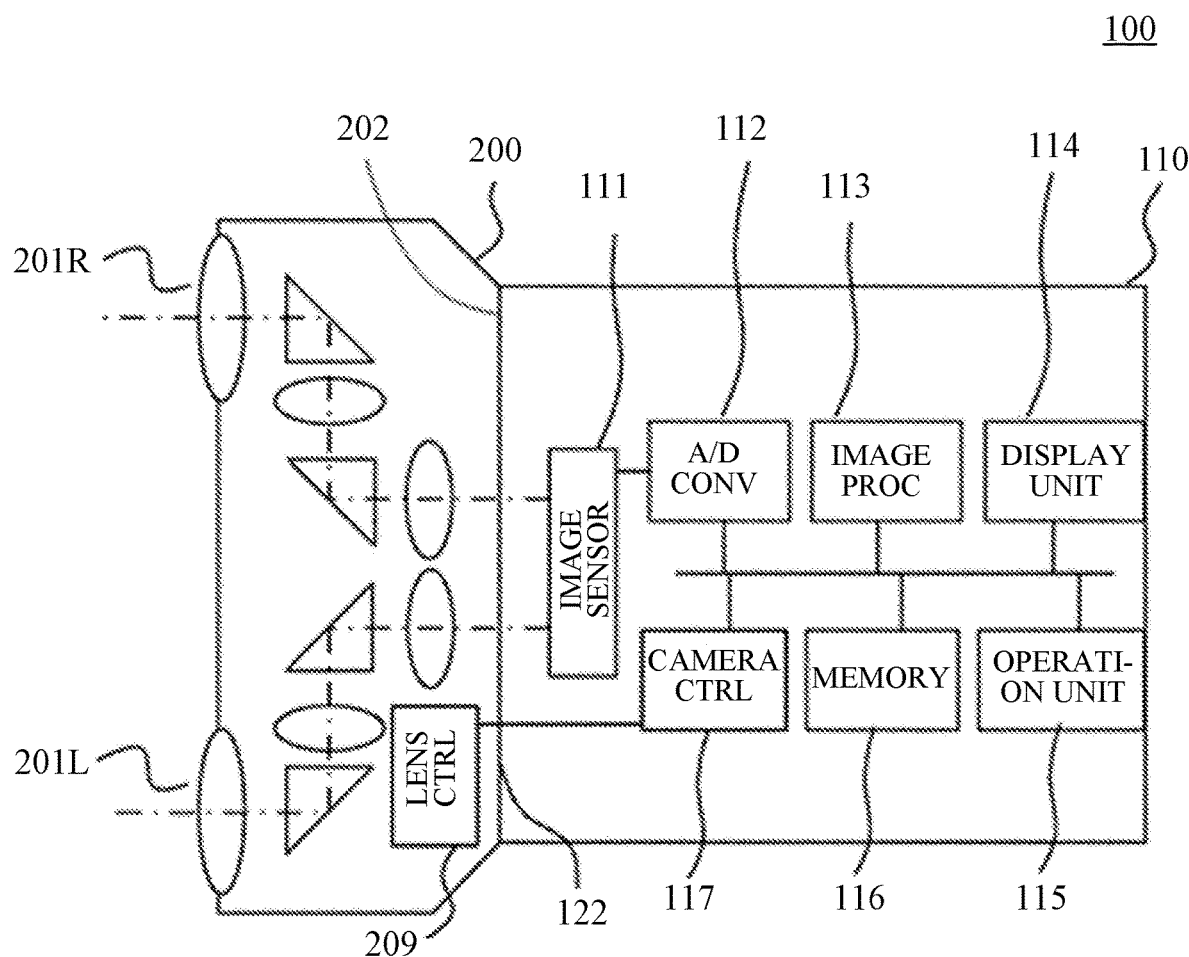
FIG. 1 is a schematic configuration diagram of a camera system according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a schematic configuration diagram of a camera system 100 according to one embodiment of the disclosure. The camera system 100 includes a camera body (image pickup apparatus) 110 and a lens apparatus (interchangeable lens) 200, and can capture a stereoscopic image.

The camera body 110 includes an image sensor 111, an analog-to-digital (A/D) converter 112, an image processing unit 113, a display unit 114, an operation unit 115, a memory (storage unit) 116, a camera control unit (camera ctrl) 117, and a camera mount 122.

The lens apparatus 200 has a right-eye optical system (first optical system) 201R, a left-eye optical system (second optical system) 201L, a lens mount 202, and a lens control unit (lens ctrl) 209, and is attached to and detachable from the camera body 110. The two optical systems are arranged in parallel (symmetrically) so that two image circles are formed in parallel on an imaging plane of the image sensor 111. The two optical systems are horizontally spaced apart by a predetermined distance (baseline length). When viewed from the imaging plane side (image side), an image formed by the right-eye optical system 201R is recorded as a moving image or still image for the right eye, and an image formed by the left-eye optical system 201L is recorded as a moving image or still image for the left eye. When a moving image or still image is played back, a three-dimensional display, virtual reality (VR) goggles, or the like is used to view the image, so that the right eye of the viewer views the image for the right eye and the left eye of the viewer views the image for the left eye. At this time, images with parallax are projected to the right eye and the left eye depending on the baseline length, so the viewer can obtain a three-dimensional effect. Thus, the lens apparatus 200 is a lens apparatus for stereoscopic imaging that can form two images with parallax using the two optical systems.

When the lens apparatus 200 is attached to the camera body 110 via the lens mount 202 and the camera mount 122, the camera control unit 117 and the lens control unit 209 are electrically connected. The image sensor 111 converts a formed object image (optical signal) into an analog electric signal. The A/D converter 112 converts the analog electrical signal output from the image sensor 111 into a digital electrical signal (image signal). The image processing unit 113 performs various image processing for the digital electrical signal output from the A/D converter 112. The display unit 114 is, for example, an electronic viewfinder or a liquid crystal panel, and displays various types of information. The operation unit 115 functions as a user interface for the user to give instructions to the camera system 100. In a case where the display unit 114 has a touch panel, the touch panel serves as the operation unit 115. The memory 116 is, for example, a ROM, a RAM, and an HDD, and stores various data such as image data that has received image processing by the image processing unit 113 and programs. The camera control unit 117 is, for example, a CPU, and controls the entire camera system 100.

Figure 2:
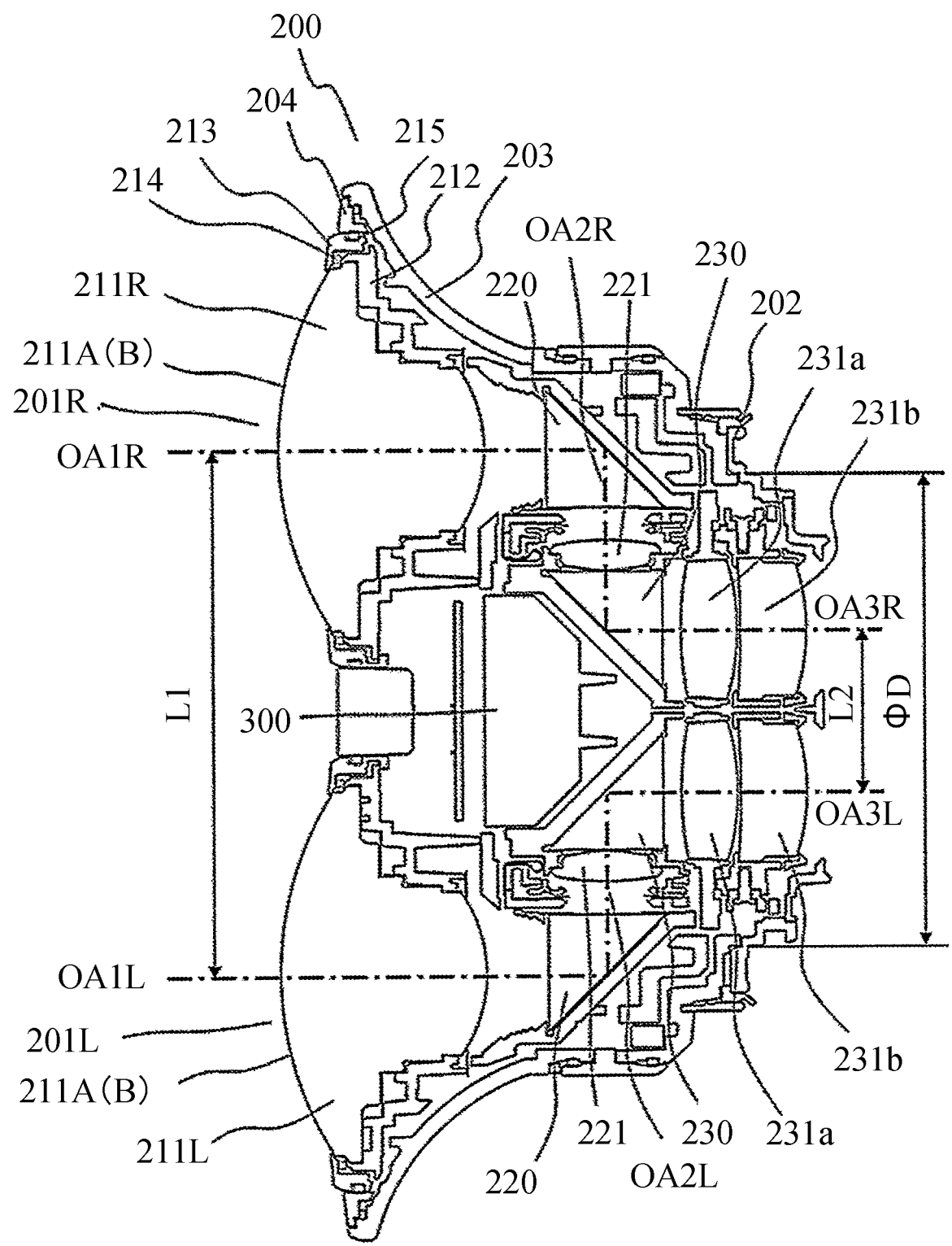
FIG. 2 is a sectional view of a lens apparatus.
Figure 3:
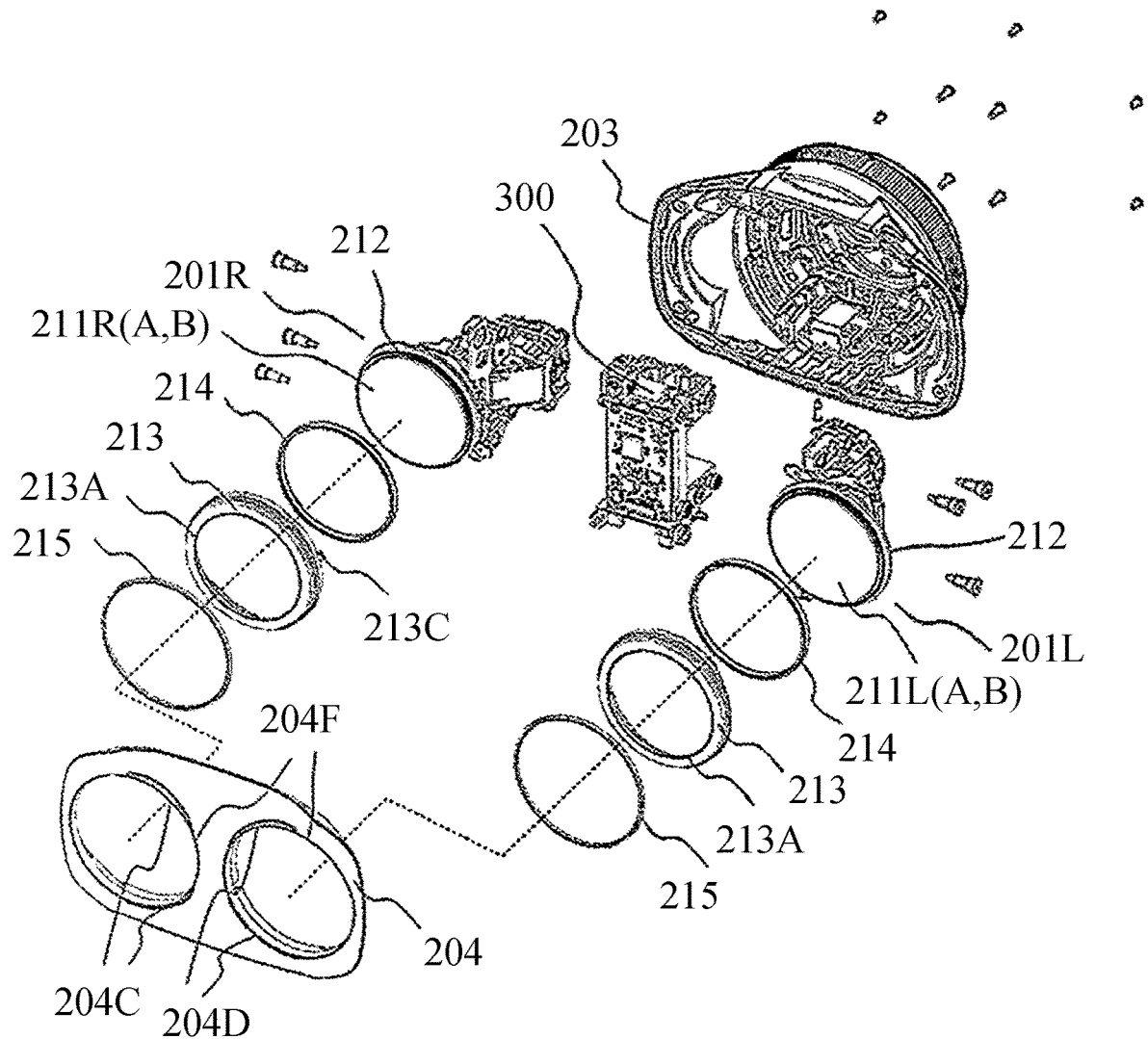
FIG. 3 is an exploded perspective view of the lens apparatus viewed from an object side.
Figure 4:
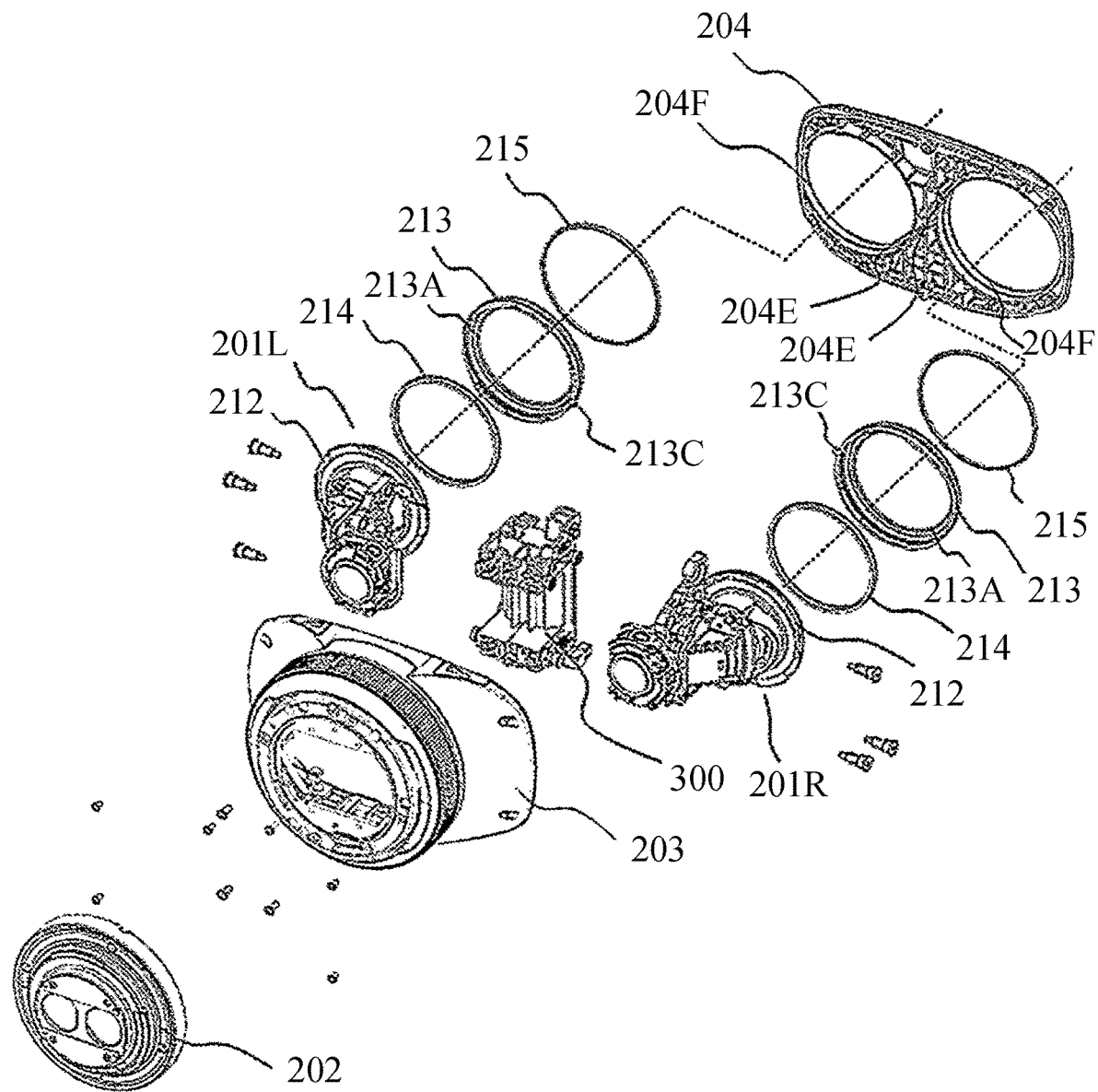
FIG. 4 is an exploded perspective view of the lens apparatus viewed from an imaging plane side.

FIG. 2 is a sectional view of the lens apparatus 200. FIG. 3 is an exploded perspective view of the lens apparatus 200 viewed from the object side. FIG. 4 is an exploded perspective view of the lens apparatus 200 viewed from the imaging plane side. In the following description, a description of the right-eye optical system 201R will be labeled with R, and a description of the left-eye optical system 201L will be labeled with L. Neither R nor L is added to the end of a reference numeral for a description common to both the right-eye optical system 201R and the left-eye optical system 201L.

Each of the right-eye optical system 201R and the left-eye optical system 201L can capture an image with an angle of view exceeding 180 degrees. Each optical system is a refractive optical system having two reflecting surfaces. Each optical system sets a first optical axis OA1, a second optical axis OA2 substantially orthogonal to the first optical axis OA1, and a third optical axis OA3 parallel to the first optical axis OA1 in order from the object side. Each optical system includes a first lens unit 211 having a lens surface 211A that is convex on an object side disposed on the first optical axis OA1, a second lens unit 221 disposed on the second optical axis OA2, and third lens units 231a and 231b disposed on the third optical axis OA3. Each optical system includes a first prism 220 that bends a light beam along the first optical axis OA1 and guides it to the second optical axis OA2, and a second prism 230 that bends a light beam along the second optical axis OA2 and guides it to the third optical axis OA3. In this embodiment, an optical axis direction is a direction extending toward the object side and the imaging plane side, and is a direction parallel to the first optical axis OA1.

Each optical system is fixed to a lens top base 300 by screwing or the like. The lens top base 300 is fixed to a lens bottom base by screws or the like. The lens bottom base is held movably in the optical axis direction while its movement in the rotational direction is restricted. Thereby, each optical system can be moved together in the optical axis direction, so that the focus positions of the right-eye optical system 201R and the left-eye optical system 201L can be adjusted at the same time.

Figure 5:
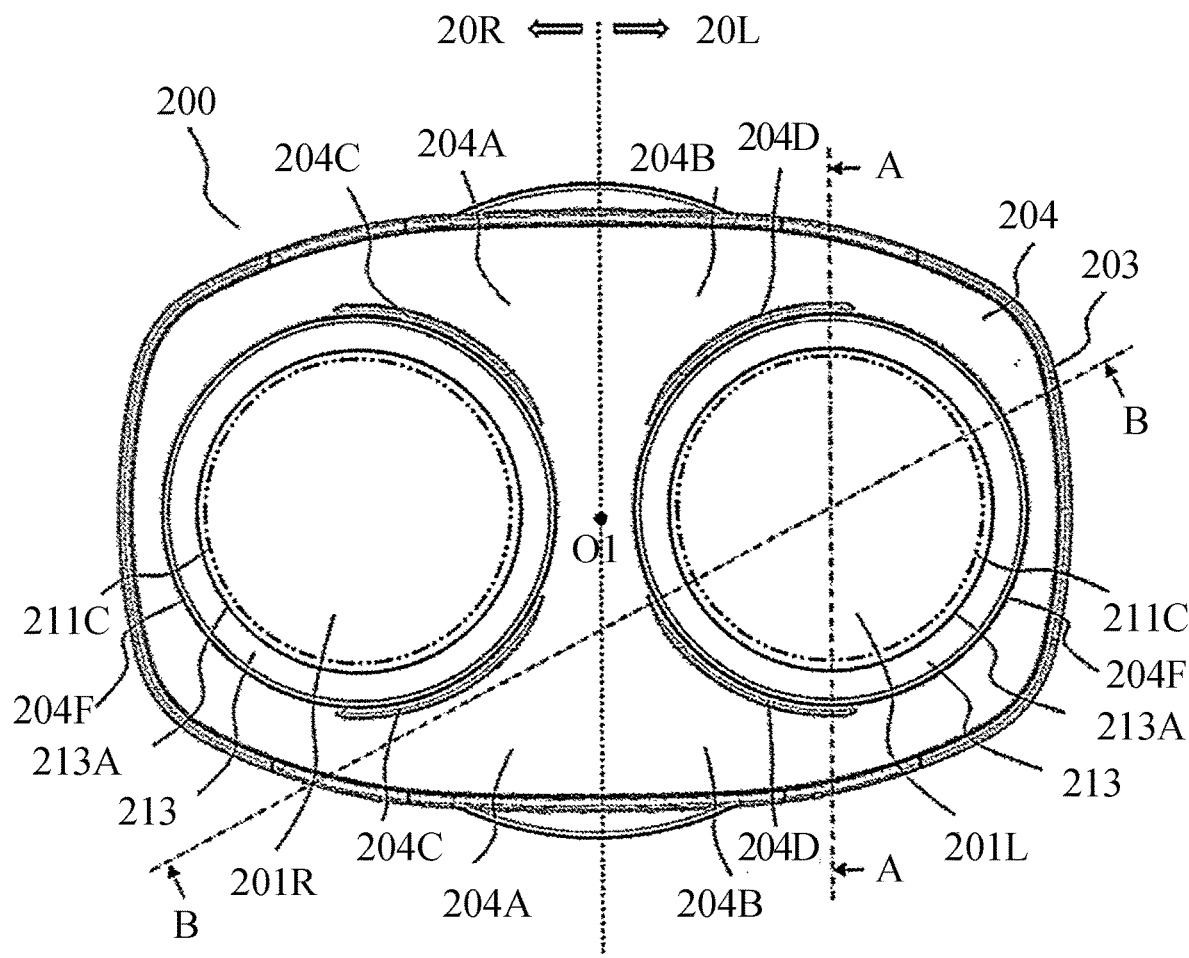
FIG. 5 is a front view of the lens apparatus.
Figure 6:
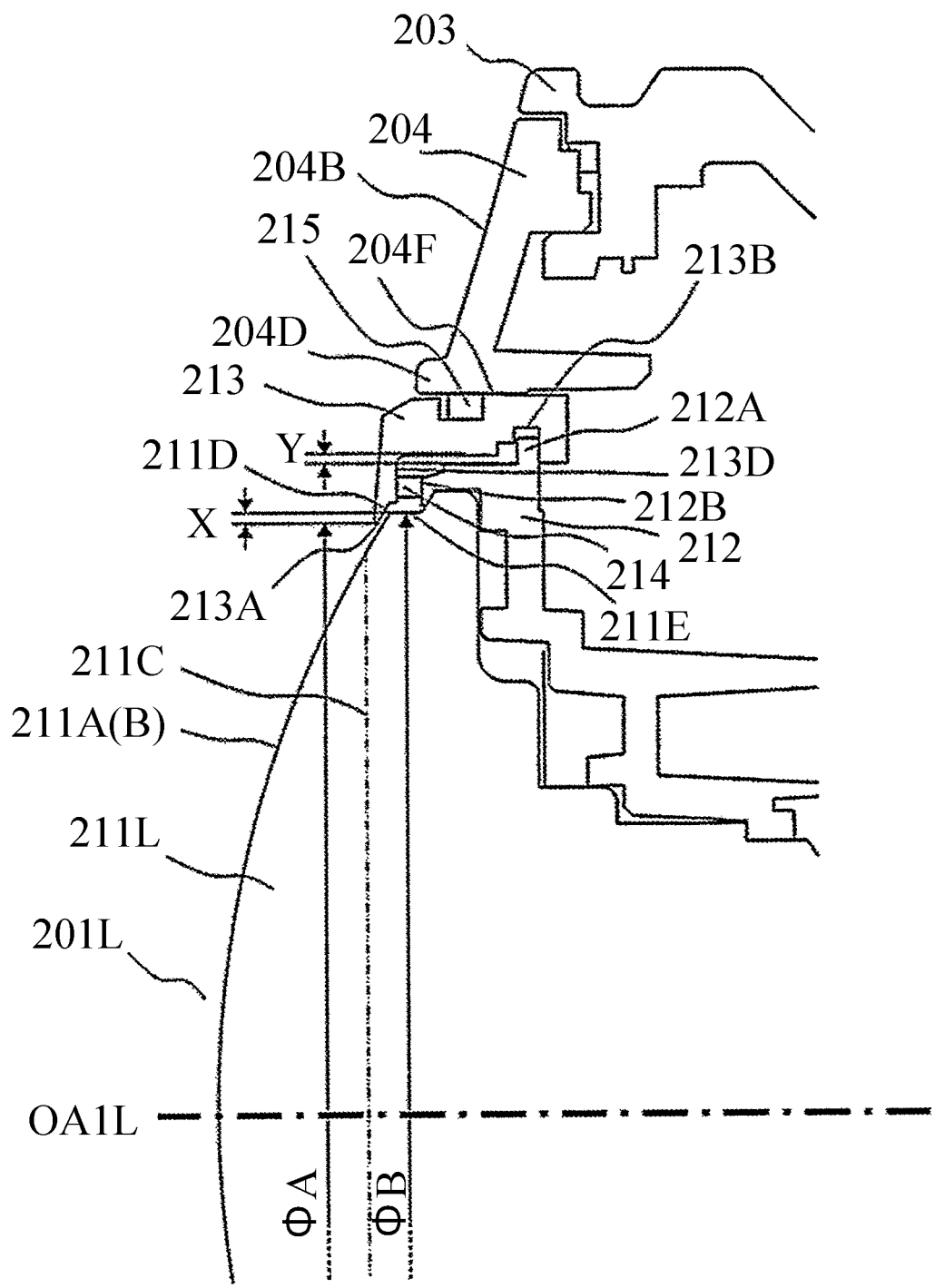
FIG. 6 is a sectional view taken along a line A-A in FIG. 5.
Figure 7:
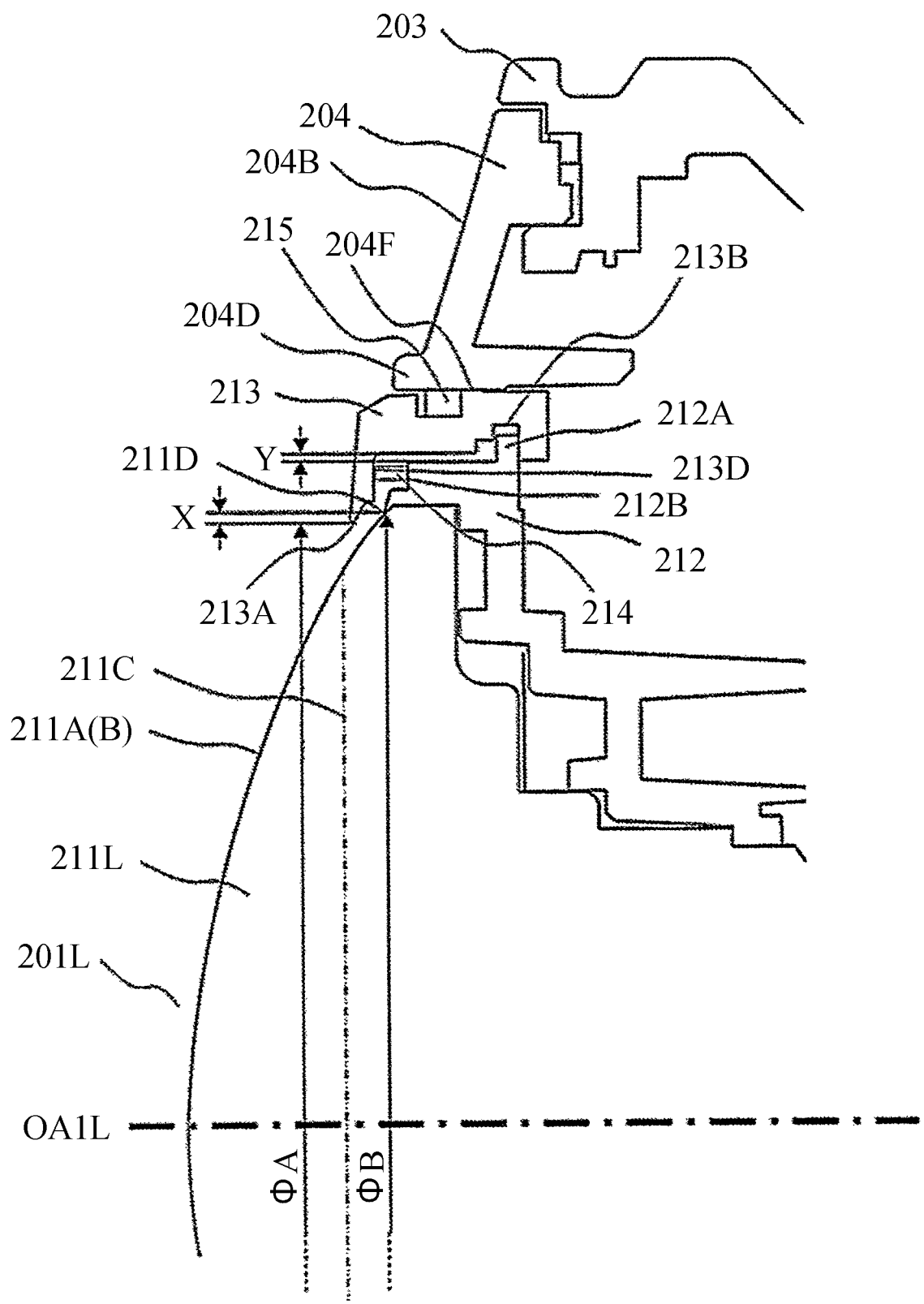
FIG. 7 illustrates a variation of the lens apparatus.
Figure 8:
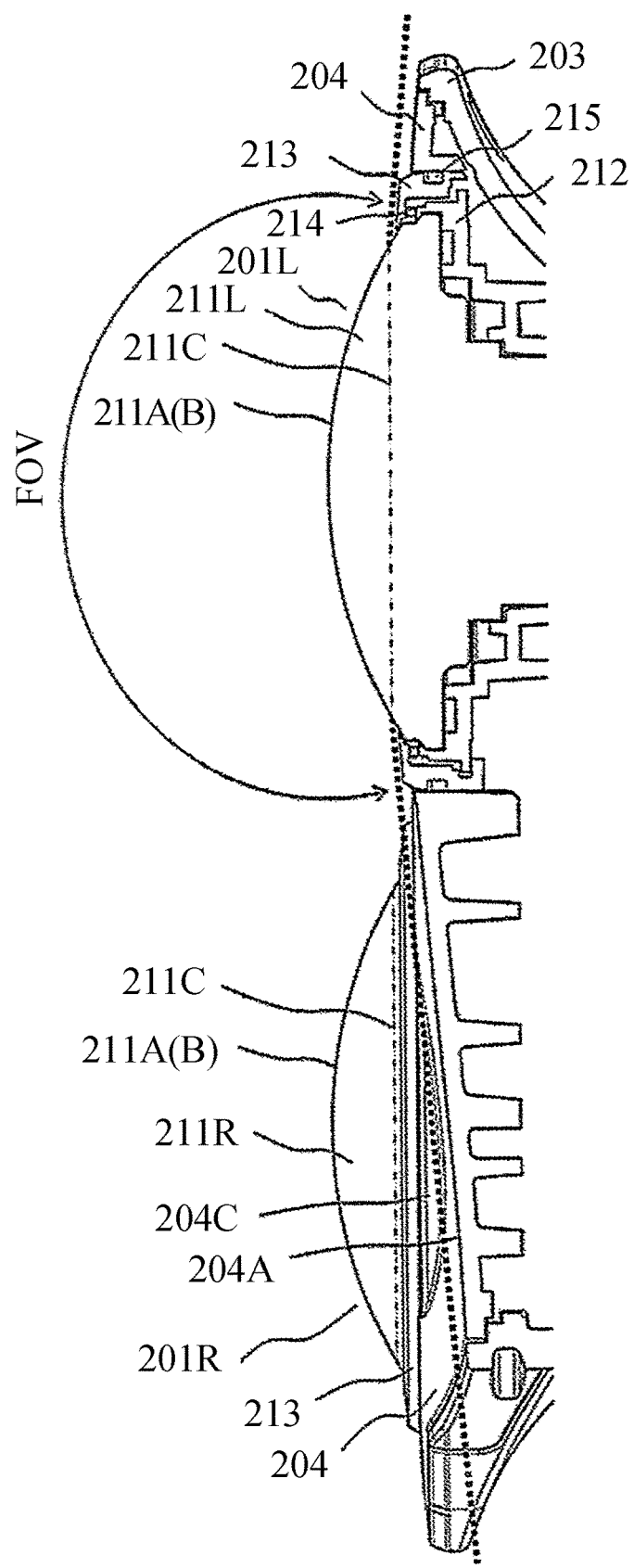
FIG. 8 is a sectional view taken along a line B-B in FIG. 5.

FIG. 5 is a front view of the lens apparatus 200. FIG. 6 is a sectional view taken along a line A-A in FIG. 5, illustrating the structure of the first lens unit 211 and its periphery. FIG. 7 illustrates a variation of the lens apparatus 200. FIG. 8 is a sectional view taken along a line B-B in FIG. 5, illustrating the structure of the first lens unit 211 and its periphery.

The lens apparatus 200 has an exterior cover member 203 and a front exterior member 204. The exterior cover member 203 houses the right-eye optical system 201R and the left-eye optical system 201L. The front exterior member 204 is fixed to the exterior cover member 203 with screws, and accommodates the front side of the lens apparatus 200 together with the exterior cover member 203 so as to cover it.

The front exterior member 204 includes openings 204F into which the first lens unit 211R of the right-eye optical system 201R and the first lens unit 211L of the left-eye optical system 201L are respectively inserted. Object-side lens surfaces 211A of the first lens units 211R and 211L are incident surfaces for effective light beams each having an effective angle of view FOV exceeding 180 degrees of the right-eye optical system 201R and the left-eye optical system 201L. Assume that the inside of an effective incident surface outer diameter 211C of the lens surface 211A is defined as an effective incident surface 211B. Then, a light beam with an angle of view of 180 degrees enters the effective incident surface 211B. A light beam with an angle of view exceeding 180 degrees enters a portion closer to the imaging plane of the lens surface 211A than the effective incident surface 211B.

As illustrated in FIG. 5, assume that a side of the right-eye optical system 201R of the center point O1 between the right-eye optical system 201R and the left-eye optical system 201L is a right-eye area 20R, and a side of the left-eye optical system 201L of the center point O1 is a left-eye area 20L. Then, in the right-eye area 20R, the front exterior member 204 has an object side surface 204A that is closer to the imaging plane as it separates from the first lens unit 211L so as not to shield the outermost effective light beam of the left-eye optical system 201L indicated by a thick dotted line in FIG. 8. In the left-eye area 20L, the front exterior member 204 includes an object side surface 204B that is closer to the imaging plane as it separates from the first lens unit 211R so as not to shield the outermost effective light beam of the right-eye optical system 201R. The first lens unit 211L and its periphery viewed from the right-eye optical system 201R and in the first lens unit 211R and its periphery viewed from the left-eye optical system 201L have areas that shield parts of the mutual effective light beams.

The front exterior member 204 includes wall portions 204C and 204D that protrude toward the object side of the object side surfaces 204A and 204B in order to form the openings 204F. The wall portion 204C has an arc shape substantially coaxial with the first lens unit 211R, and does not shield the effective light beam of the right-eye optical system 201R, but shields part of the effective light beam of the left-eye optical system 201L. The wall portion 204D has an arc shape substantially coaxial with the first lens unit 211L, and does not shield the effective light beam of the left-eye optical system 201L, but shields part of the effective light beam of the right-eye optical system 201R.

The lens apparatus 200 includes a first lens unit holding member 212 and a cover member 213. The first lens unit holding member 212 holds the first lens units 211R and 211L. The cover member 213 covers the outer circumference portions of the object-side lens surfaces 211A of the first lens units 211R and 211L, and has openings 213A which the first lens units 211R and 211L enter. The opening 213A is formed so as to expose the first lens units 211R and 211L when viewed from the optical axis direction.

A boundary 211D with the lens surface 211A is formed on the outer circumference side of the effective incident surface outer diameter 211C of the first lens unit 211. A boundary 211D is a boundary between the lens surface 211A and another surface or member. For example, the boundary 211D may be a boundary between the lens surface 211A and a side surface 211E of the first lens unit 211, or as illustrated in FIG. 7, may be a boundary with an inner diameter tip portion having a caulking claw shape that caulks the lens surfaces 211A and the first lens units 211R and 211L.

The cover member 213 covers the boundary 211D when viewed from the imaging plane side. That is, the inner diameter of the opening 213A in the cover member 213 is smaller than the diameter of boundary 211D. An overlap amount X on one side is expressed by the following equation (1):

$$X = (\Phi B - \Phi A)/2 \tag{1}$$

where $\Phi A$ is an inner diameter of the opening 213A, and $\Phi B$ is a diameter of the boundary 211D.

By covering the boundary 211D with the cover member 213, the appearance quality of the lens apparatus 200 can be improved.

A groove portion 213B is formed in part of the inner circumference of the cover member 213. A convex portion 212A extending toward the outer circumference side is formed on part of the outer circumference of the first lens unit holding member 212. The groove portion 213B and the convex portion 212A are assembled so that they do not overlap each other when viewed from the imaging plane side, and by rotating the cover member 213, and the convex portion 212A is inserted into the groove portion 213B by rotating the cover member 213. Thereby, the cover member 213 is positioned with the first lens unit holding member 212 in the optical axis direction. The first lens unit holding member 212 may have a groove, and the cover member 213 may have a convex portion.

A backlash Y is formed between the first lens unit holding member 212 and the cover member 213 in a direction orthogonal to the optical axis direction (radial direction). Since the backlash Y is smaller than an overlap amount X, even if the first lens unit holding member 212 or the cover member 213 moves by the backlash Y, the cover member 213 can cover the boundary 211D.

Since the cover member 213 is positioned with the first lens unit holding member 212 in the optical axis direction, it can move integrally with the first lens unit holding member 212 in the optical axis direction. The outer diameter of the cover member 213 is fitted with the inner diameter of the opening 204F of the front exterior member 204. The backlash in the direction orthogonal to the optical axis direction formed between the front exterior member 204 and the cover member 213 is minute and smaller than the backlash Y.

The cover member 213 has a rotation restriction key 213C, and the front exterior member 204 has a rotation restriction groove 204E corresponding to the rotation restriction key 213C. Thereby, in a case where the front exterior member 204 is assembled, the rotation restriction key 213C enters the rotation restriction groove 204E, and the rotation of the cover member 213 is restricted. Thus, the cover member 213 can be prevented from rotating and coming off the first lens unit holding member 212. The cover member 213 may have a rotation restriction groove, and the front exterior member 204 may have a rotation restriction key.

Each optical axis direction sealing member 214 is a drip-proof dustproof member, and is located between a surface 213D on the imaging plane side of the cover member 213 and a surface 212B on the object side facing the surface 213D of the first lens unit holding member 212 to seal a space between the surfaces 213D and 212B. The surfaces 213D and 212B may be formed around the entire circumference of the cover member 213 and the first lens unit holding member 212, respectively, but may be partially formed. The cover member 213 and the first lens unit holding member 212 are sandwiched in the optical axis direction by the optical axis direction sealing member 214 and are biased in the optical axis direction. Thereby, play in the optical axis direction between the cover member 213 and the first lens unit holding member 212 can be reduced.

In order to maintain the backlash Y, the optical axis direction sealing member 214 is disposed with a clearance (gap) larger than the backlash Y with the cover member 213 and the first lens unit holding member 212 in the direction orthogonal to the optical axis direction. The optical axis direction sealing member 214 is made of an elastically deformable material such as rubber or sponge, and can absorb the backlash Y.

Each radial direction sealing member 215 is a drip-proof and dustproof member, and disposed while sandwiched between the cover member 213 and the front exterior member 204 in the direction orthogonal to the optical axis direction. The radial direction sealing member 215 on the right-eye optical system 201R side is disposed at a position that shields the effective light beam of the left-eye optical system 201L, and the radial direction sealing member 215 on the left-eye optical system 201L side is disposed at a position that shields the effective light beam of the right-eye optical system 201R.

The above configuration can realize the lens apparatus 200 that can achieve both dustproof and drip-proof performance and optical performance while maintaining the appearance quality, and can provide stereoscopic imaging at an angle of view exceeding 180 degrees. Since the first lens unit holding member 212 is not directly engaged with the opening 204F of the front exterior member 204, even if the first lens unit holding member 212 is displaced due to manufacturing error or the like, the position can be never corrected. Therefore, the optical performance and the relative error between the right-eye optical system 201R and the left-eye optical system 201L do not change even if the front exterior member 204 is incorporated.

Figure 9:
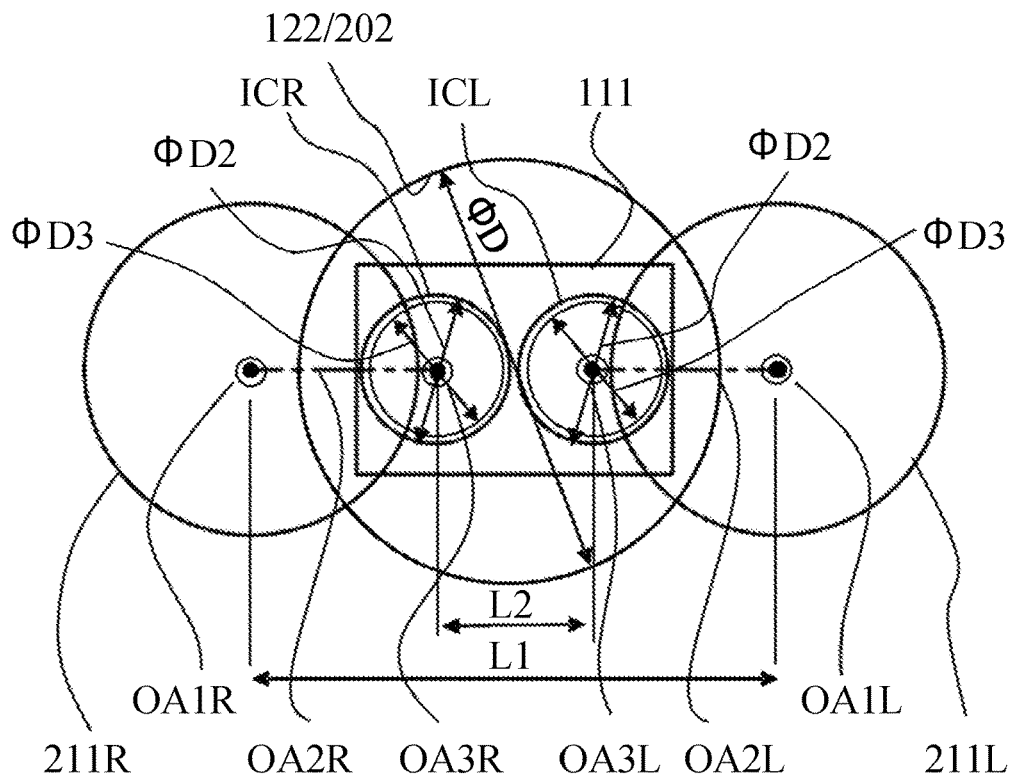
FIG. 9 illustrates a positional relationship between each optical axis of the lens apparatus and each image circle on an image sensor.

FIG. 9 illustrates a positional relationship between the optical axes of the lens apparatus 200 and the image circles on the image sensor 111.

On the image sensor 111, a right-eye image circle ICR with an effective angle of view formed by the right-eye optical system 201R and a left-eye image circle ICL with an effective angle of view formed by the left-eye optical system 201L are imaged in parallel. A diameter $\Phi D2$ of each image circle and the distance between the image circles are set so that the image circles do not or are less likely to overlap each other. The light receiving range of the image sensor 111 may be divided into left and right halves with respect to the center, and the center of the right-eye image circle ICR may be set approximately at the center of the right area, and the center of the left-eye image circle ICL may be set approximately at the center of the left area.

Each optical system is a wide-angle fisheye lens. In this embodiment, each optical system is a circular fish-eye lens, and the image formed on the imaging plane is a circular image reflecting a range of angle of view exceeding 180 degrees, as illustrated in FIG. 9, two circular images are formed on the left and right sides. The longer a distance (baseline length) L1 between a first optical axis OA1R of the right-eye optical system 201R and a first optical axis OA1L of the left-eye optical system 201L is, the greater the stereoscopic effect during viewing becomes. For example, assume that the image sensor 111 has a size of 24 mm long by 36 mm wide, the image circle has the diameter ΦD2 of 17 mm, a distance L2 between the third optical axes OA3R and OA3L is 18 mm, and the second optical axes OA2R and OA2L have a length of 21 mm. At this time, the baseline length L1 becomes 60 mm, which is approximately equal to an interpupillary distance of an adult. By making the diameter ΦD of the lens mount 202 shorter than the baseline length L1 and longer than the distance L2 between the third optical axes, the lens disposed on the third optical axis can be positioned inside the lens mount 202. In VR viewing, the angle of view at which a stereoscopic effect can be obtained is about 120 degrees. The field of about 120 degrees may provide a strange feeling, and thus an angle of view is often extended to an angle up to 180 degrees. In this embodiment, since the effective angle of view exceeds 180 degrees, the diameter ΦD2 of the image circle is larger than a diameter ΦD3 of the image circle within the range of 180 degrees.

Figure 10:
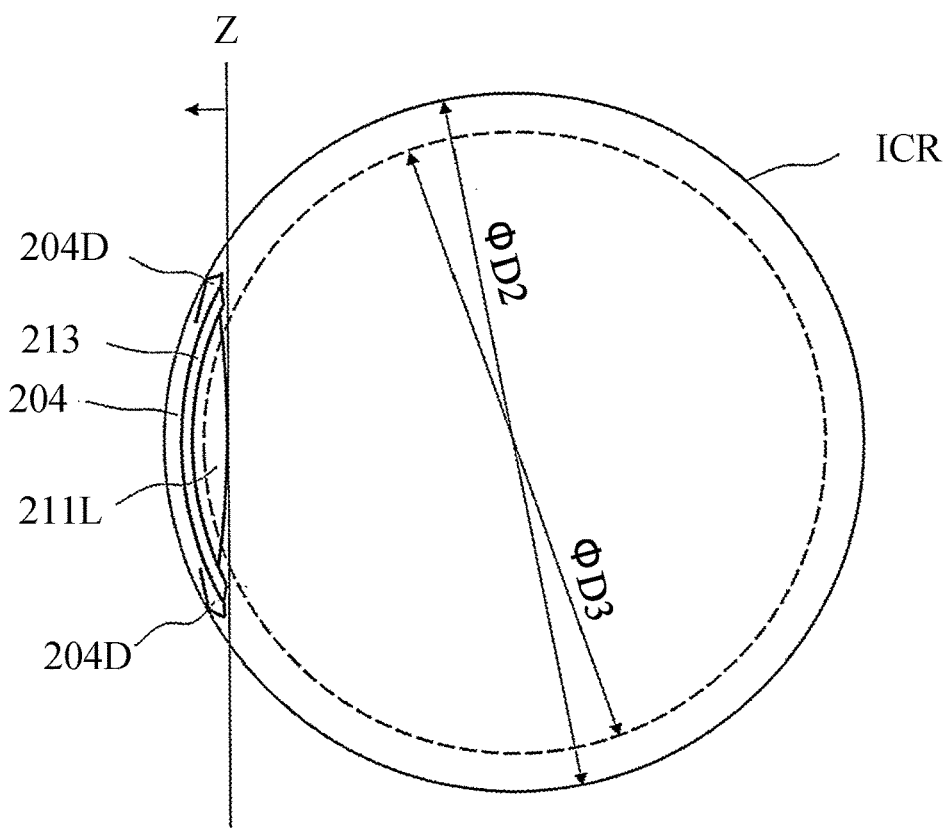
FIG. 10 illustrates the reflection of a left-eye optical system on an image captured by a right-eye optical system.

FIG. 10 illustrates the reflection of the left-eye optical system 201L on an image formed by the right-eye optical system 201R. The first lens unit 211L, the cover member 213, and the wall portion 204D are present within the effective angle of view of the right-eye optical system 201R, and they are reflected in the actual effective imaging range as illustrated in FIG. 10. The first lens unit 211L is imaged inside the diameter ΦD3 of the image circle with an angle of view of 180 degrees, and the cover member 213 and the wall portion 204D are imaged outside the diameter ΦD3 of the image circle with an angle of view of 180 degrees and inside the diameter ΦD2 of the image circle. Therefore, the cover member 213 and the wall portion 204D do not affect VR viewing at an angle of view of 180 degrees. The cover member 213 and the wall portion 204D are imaged outside (left side in FIG. 10) of a vertex portion of the first lens unit 211L. Only if a portion is cut outside the vertex portion illustrated by a straight line Z of the first lens unit 211L, which is always reflected on image processing and image editing due to the specifications, the reflection of the cover member 213 and the wall portion 204D will no longer be influential. This is similarly applied to the reflection of the right-eye optical system 201R on an image formed by the left-eye optical system 201L. As described above, the cover member 213 and the wall portion 204D are disposed within the effective angle of view but they are disposed so as not to negatively affect imaging for actual VR applications.

FIRST EMBODIMENT

Figure 11:
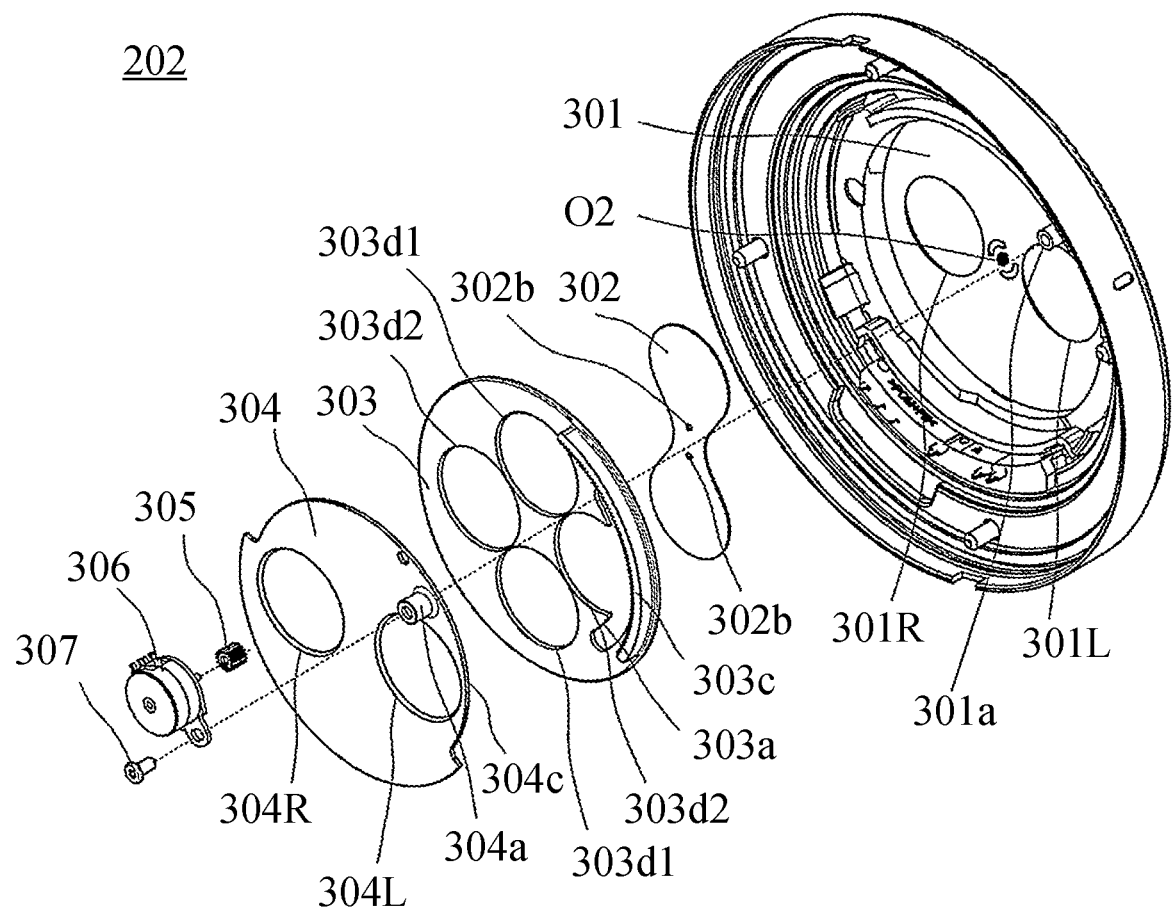
FIG. 11 is an exploded perspective view of a lens mount according to a first embodiment viewed from the object side.
Figure 12:
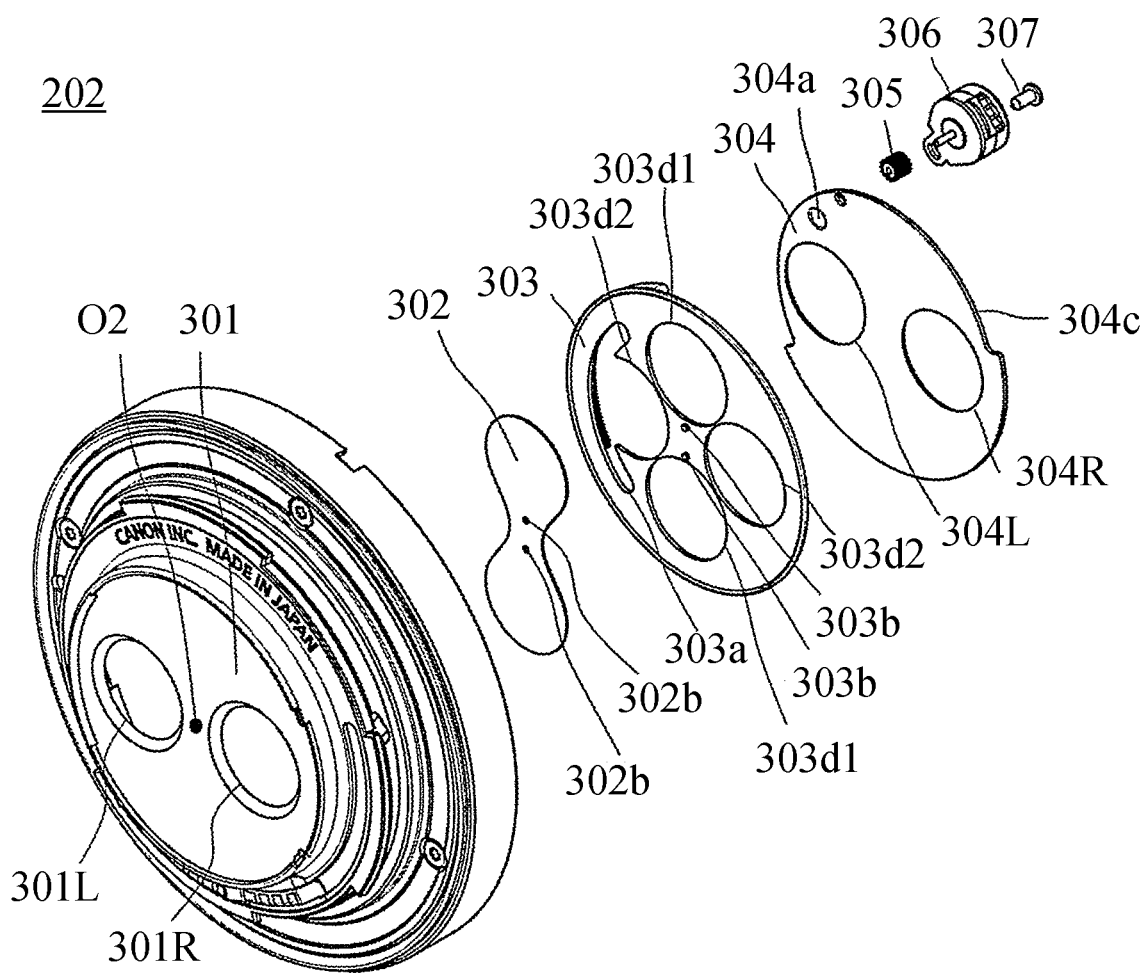
FIG. 12 is an exploded perspective view of the lens mount according to the first embodiment viewed from the imaging plane side.
Figure 13:
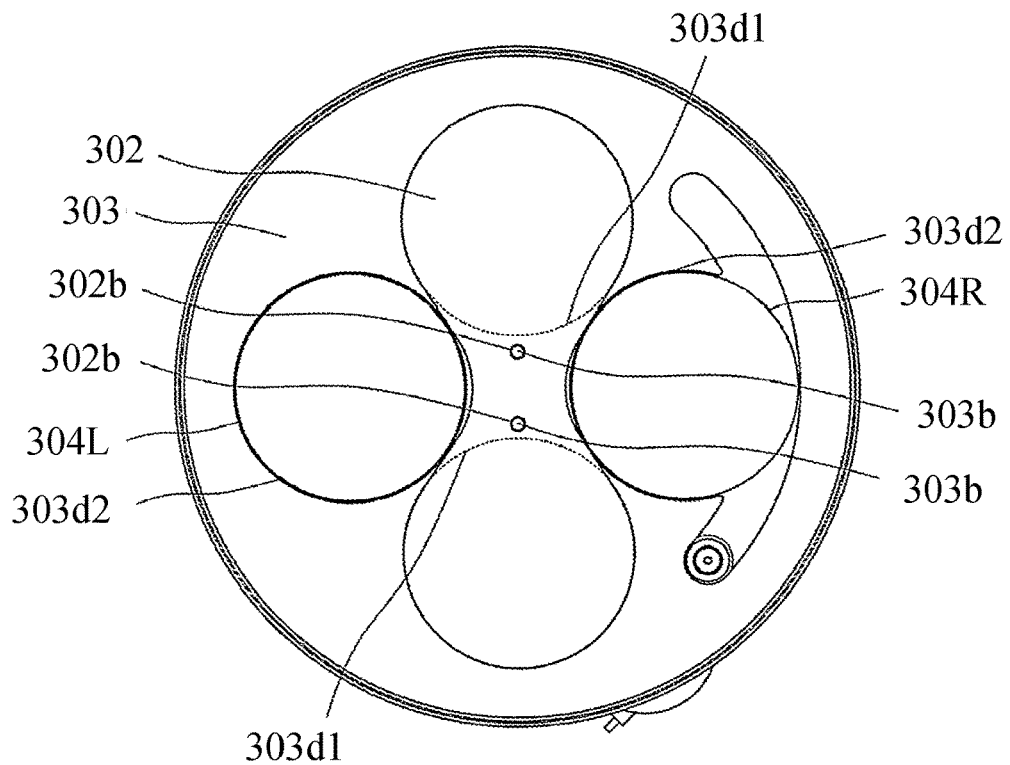
FIG. 13 is a rear view of the lens mount according to the first embodiment after the filter is retracted.
Figure 14:
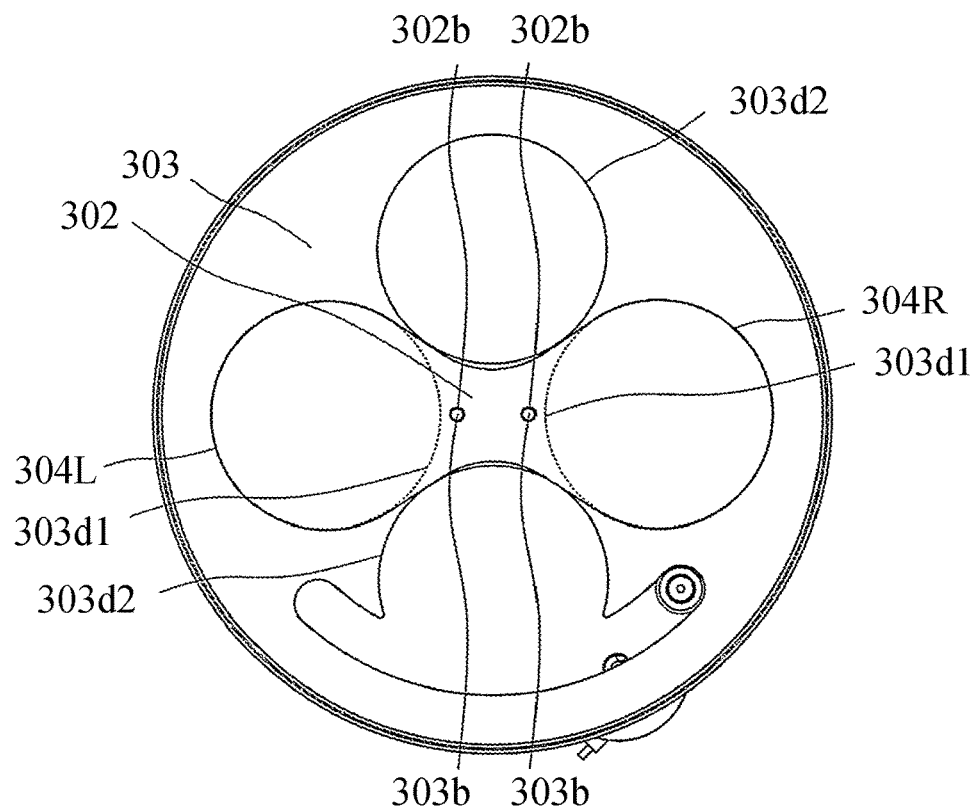
FIG. 14 is a rear view of the lens mount according to the first embodiment after the filter is inserted.

This embodiment will discuss a configuration of the lens mount 202. FIG. 11 is an exploded perspective view of the lens mount 202 viewed from the object side. FIG. 12 is an exploded perspective view of the lens mount 202 viewed from the imaging plane side. FIG. 13 is a rear view of the lens mount 202 after the filter is retracted. FIG. 14 is a rear view of the lens mount 202 in a case after the filter is inserted.

The lens mount 202 includes a mount cover 301, a filter (filter member) 302, a ring member (rotating member) 303, a cover member 304, a gear 305, a motor (driving unit) 306, and a screw 307.

The mount cover 301 includes a right-eye opening 301R corresponding to the right-eye optical system 201R and a left-eye opening 301L corresponding to the left-eye optical system 201L. The mount cover 301 further includes a motor fixing portion 301a. The motor 306 is fixed to the motor fixing portion 301a with the screw 307 on the object side of the filter 302.

The ring member 303 has an elongated hole portion 303a, projection portions 303b, and a power transmission portion 303c. The gear 305 attached to an output shaft of the motor 306 and a gear formed on the power transmission portion 303c are engaged with each other, so that the ring member 303 is rotatable by 90 degrees about a lens mount center O2 in accordance with the driving of the motor 306. The elongated hole portion 303a is formed so as not to interfere with the motor fixing portion 301a while the ring member 303 is rotated by 90 degrees.

The ring member 303 also has openings 303d1 and 303d2. The openings 303d1 overlap the filter 302 when they are viewed from the optical axis direction. The openings 303d2 do not overlap the filter 302 when they are viewed from the optical axis direction.

The cover member 304 includes a right-eye opening (first opening) 304R, a left-eye opening (second opening) 304L, an engagement portion 304a, and a notch portion 304c. The right-eye opening 304R and the left-eye opening 304L correspond to the right-eye optical system 201R and the left-eye optical system 201L, respectively, and are formed at positions overlapping the right-eye opening 301R and the left-eye opening 301L in the mount cover 301. The cover member 304 is fixed to the mount cover 301 because the engagement portion 304a is engaged with the motor fixing portion 301a. An inner bottom surface of the engagement portion 304a and an upper surface of the motor fixing portion 301a contact each other, so that the cover member 304 is engaged with the mount cover 301 while a gap is formed between them. The ring member 303 is fixed in the optical axis direction and held between the mount cover 301 and the cover member 304 rotatably about the lens mount center O2. The notch portion 304c is formed so as not to interfere with the power transmission portion 303c.

The filter 302 is held by the ring member 303 because the projection portions 303b provided on the ring member 303 are engaged with holes 302b provided in the central portion of the filter 302. The filter 302 is movable between a first state (state illustrated in FIG. 13) in which the filter 302 is retracted from right-eye opening 304R and left-eye opening 304L provided in the cover member 304, and a second state (state illustrated in FIG. 14) in which the filter 302 is inserted into the right-eye opening 304R and left-eye opening 304L. The openings 303d1 provided in the ring member 303 overlap the right-eye opening 304R and the left-eye opening 304L in the second state. The openings 303d2 provided in the ring member 303 overlap the right-eye opening 304R and the left-eye opening 304L in the first state.

In a case where the motor 306 is driven while the filter 302 is in the first state, the filter 302 and the ring member 303 are integrally rotated by 90 degrees. Thereby, the filter 302 is simultaneously retracted from the right-eye opening 304R and the left-eye opening 304L and enters the second state. In a case where the motor 306 is driven while the filter 302 is in the second state, the filter 302 and the ring member 303 are integrally rotated by 90 degrees. Thereby, the filter 302 is simultaneously inserted into the right-eye opening 304R and the left-eye opening 304L and enters the first state. Here, "simultaneously" includes not only exactly the same timing but also substantially the same timing (approximately the same timing). Thus, the configuration according to this embodiment can simultaneously retract the filter 302 from or insert the filter 302 into the two openings having different phases.

Although the ring member 303 is rotated by the motor driving in this embodiment, it may be rotated by manually operating an operation member for operating the ring member 303.

SECOND EMBODIMENT

Figure 15:
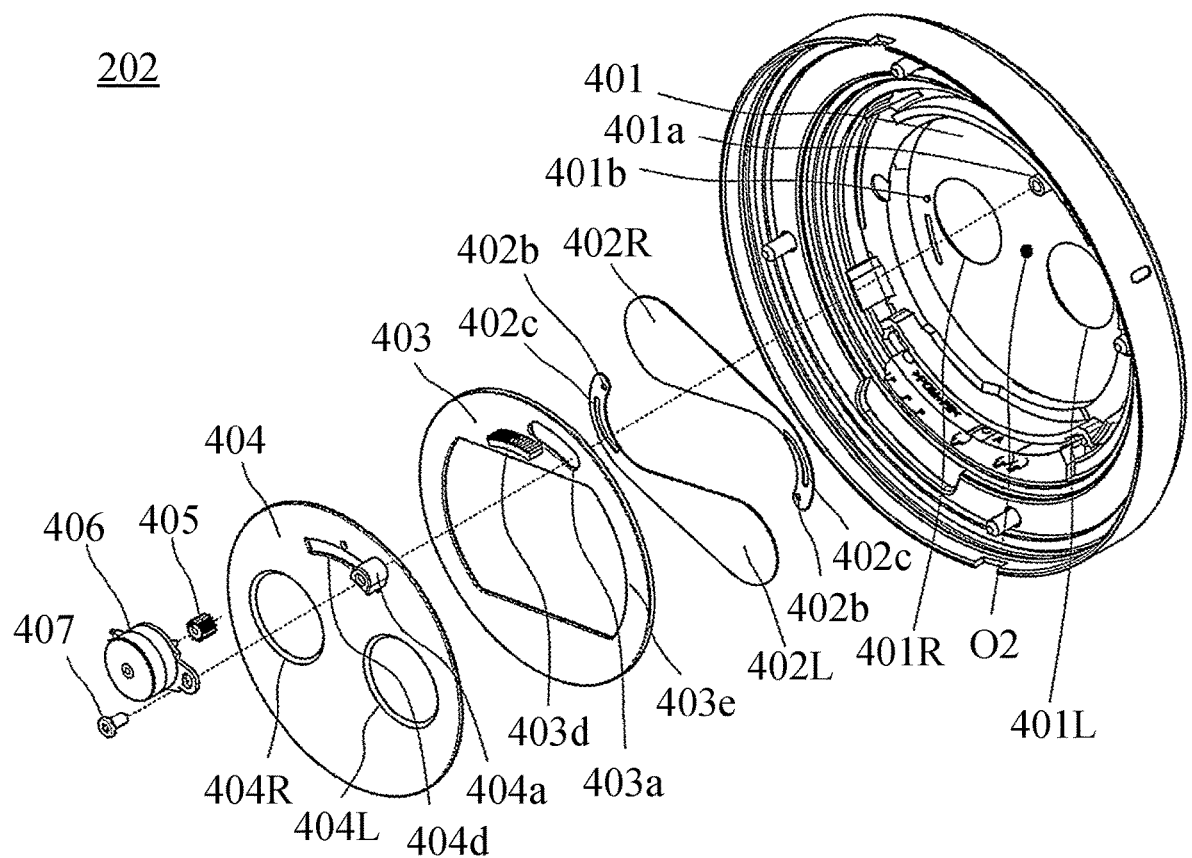
FIG. 15 is an exploded perspective view of the lens mount according to a second embodiment viewed from the object side.
Figure 16:
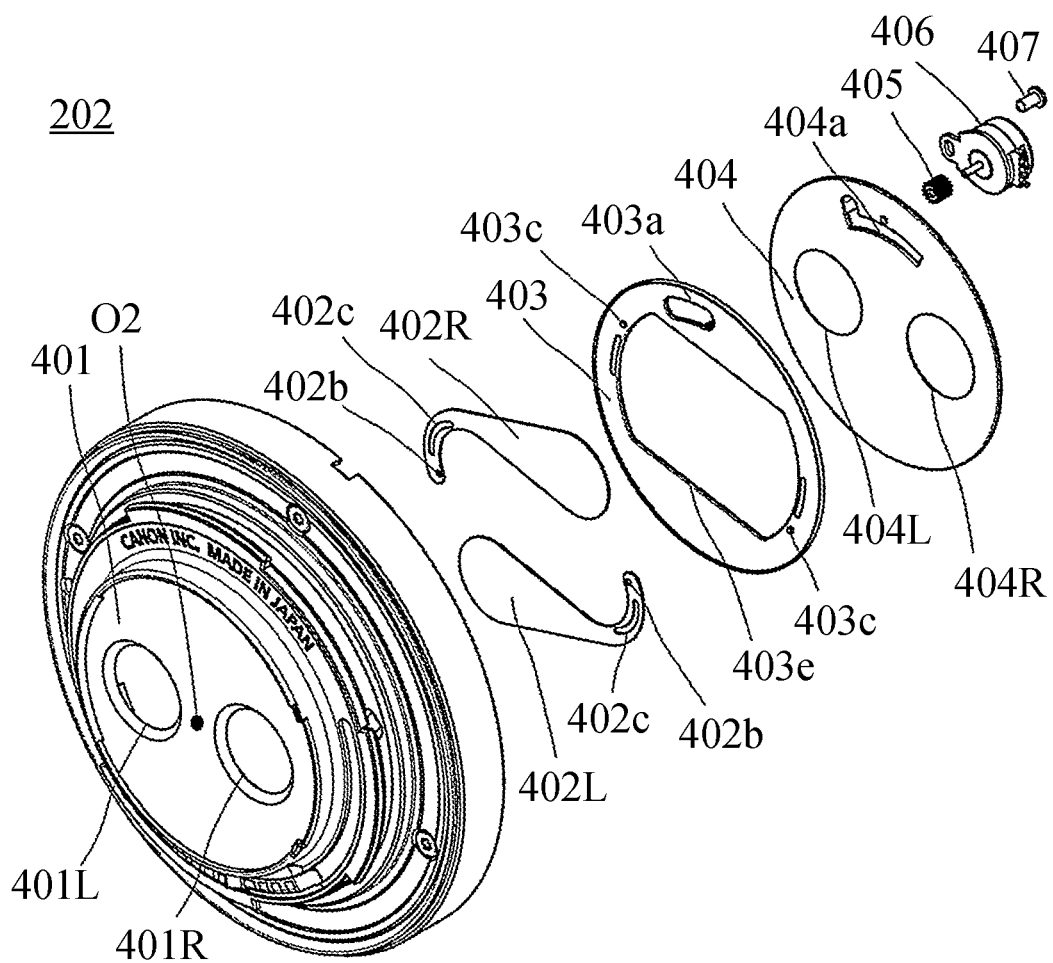
FIG. 16 is an exploded perspective view of the lens mount according to the second embodiment viewed from the imaging plane side.
Figure 17:
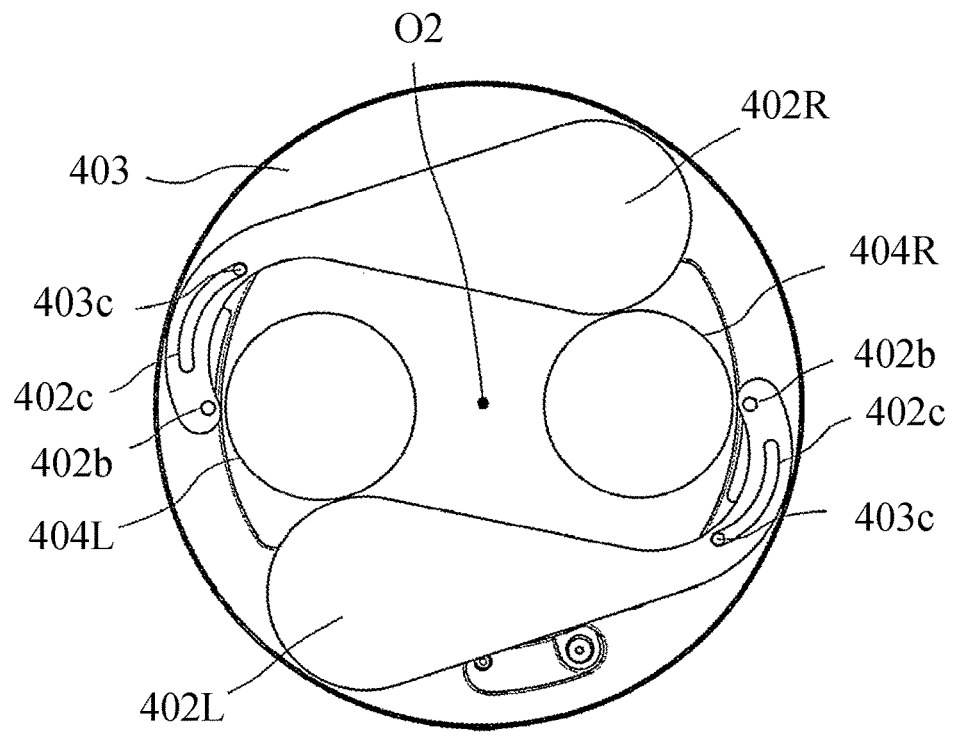
FIG. 17 is a rear view of the lens mount according to the second embodiment after the filter is retracted.
Figure 18:
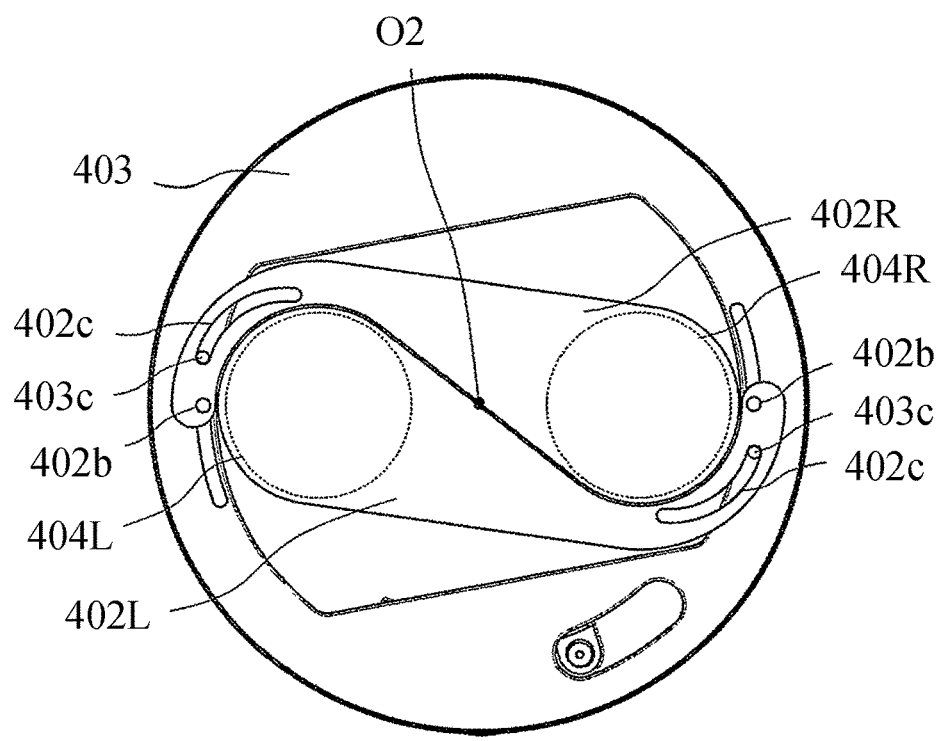
FIG. 18 is a rear view of the lens mount according to the second embodiment after the filter is inserted.

This embodiment will discuss a configuration of the lens mount 202 different from that in the first embodiment. FIG. 15 is an exploded perspective view of the lens mount 202 viewed from the object side. FIG. 16 is an exploded perspective view of the lens mount 202 viewed from the imaging plane side. FIG. 17 is a rear view of the lens mount 202 after where the filter is retracted. FIG. 18 is a rear view of the lens mount 202 after the filter is inserted. This embodiment will discuss only a configuration different from that of the first embodiment, and will omit a detailed description of the common configuration.

The lens mount 202 includes a mount cover 401, blade-shaped filters (filter members) 402R and 402L, a ring member (rotating member) 403, a cover member 404, a gear 405, a motor (driving unit) 406, and a screw 407.

The mount cover 401 includes a right-eye opening 401R corresponding to the right-eye optical system 201R and a left-eye opening 401L corresponding to the left-eye optical system 201L. The mount cover 401 further includes a motor fixing portion 401a and projection portions 401b. The motor 406 is fixed to the motor fixing portion 401a with the screw 407 on the object side of the filters 402R and 402L.

The ring member 403 has an elongated hole portion 403a, a cam follower 403c, a power transmission portion 403d, and an opening 403e. The elongated hole portion 403a penetrates the motor fixing portion 401a and is formed so as not to interfere with the motor fixing portion 401a. The gear 405 attached to an output shaft of the motor 406 is engaged with a gear formed on the power transmission portion 403d, so that the ring member 403 is rotatable in accordance with the driving of the motor 406. The opening 403e is formed so as not to overlap the right-eye opening 401R and the left-eye opening 401L of the mount cover 401 within the rotation range of the ring member 403.

The cover member 404 includes a right-eye opening (first opening) 404R, a left-eye opening (second opening) 404L, an engagement portion 404a, and a penetration hole portion 404d. The right-eye opening 404R and the left-eye opening 404L correspond to the right-eye optical system 201R and the left-eye optical system 201L, respectively, and are formed at positions overlapping the right-eye opening 401R and the left-eye opening 401L in the mount cover 401. The cover member 404 is fixed to the mount cover 401 because the engagement portion 404a is engaged with the motor fixing portion 401a. An inner bottom surface of the engagement portion 404a and an upper surface of the motor fixing portion 401a contact each other, so that the cover member 404 is engaged with the mount cover 401 while a gap is formed between them. Therefore, the ring member 403 is fixed in the optical axis direction and sandwiched between the mount cover 401 and the cover member 404 rotatably about the lens mount center O2. The penetration hole portion 404d is formed so as not to interfere with the power transmission portion 403d of the ring member 403.

The filters 402R and 402L have the same shape and are disposed symmetrically with respect to the lens mount center O2. The filter (first filter member) 401R has an engagement hole 402b that is engaged with the protrusion portion 401b provided on the mount cover 401, and a cam groove (first cam groove) 402c that is engaged with the cam follower 403c provided on the ring member 403. The filter (second filter member) 401L has an engagement hole 402b that is engaged with the protrusion portion 401b provided on the mount cover 401, and a cam groove (second cam groove) 402c that is engaged with the cam follower 403c provided on the ring member 403. In a case where the ring member 403 is rotated around the lens mount center O2, the cam follower 403c moves along the cam groove 402c, and a rotating force (torque) is transmitted to the filters 402R and 402L. The filter 402R is rotatable about the first rotation center, and is movable between a state in which the filter 402R is retracted from the right-eye opening 404R provided in the cover member 404 (state illustrated in FIG. 17) and a state in which the filter 402R is inserted into the right-eye opening 404R (state illustrated in FIG. 18). The filter 402L is rotatable about a second rotation center different from the first rotation center, and is movable between a state in which the filter 402L is retracted from the left-eye opening 404L provided in the cover member 404 (state illustrated in FIG. 17) and a state in which the filter 402L is inserted into the left-eye opening 404L (state illustrated in FIG. 18). A state in which the filters 402R and 402L are respectively retracted from the right-eye opening 404R and the left-eye opening 404L (the state illustrated in FIG. 17) is referred to as a first state. A state in which the filters 402R and 402L are inserted into the right-eye opening 404R and the left-eye opening 404L, respectively (the state illustrated in FIG. 18) is referred to as a second state.

In a case where the motor 406 is driven while the filters 402R and 402L are in the first state, the filters 402R and 402L and the ring member 403 are integrally rotated. Thereby, the filters 402R and 402L are simultaneously retracted from the right-eye opening 404R and the left-eye opening 404L, respectively, to enter the second state. In a case where the motor 406 is driven while the filters 402R and 402L are in the second state, the filters 402R and 402L and the ring member 303 are integrally rotated. Thereby, the filters 402R and 402L are simultaneously inserted into the right-eye opening 404R and the left-eye opening 404L and enter the second state. Here, "simultaneously" includes not only exactly the same timing but also substantially the same timing (approximately the same timing). Thus, the configuration according to this embodiment can simultaneously retract the filters 402R and 402L from or insert the filters 402R and 402L into the two openings having different phases.

Although the ring member 403 is rotated by the motor driving in this embodiment, it may be rotated by manually operating an operation member for operating the ring member 403.

THIRD EMBODIMENT

Figure 19:
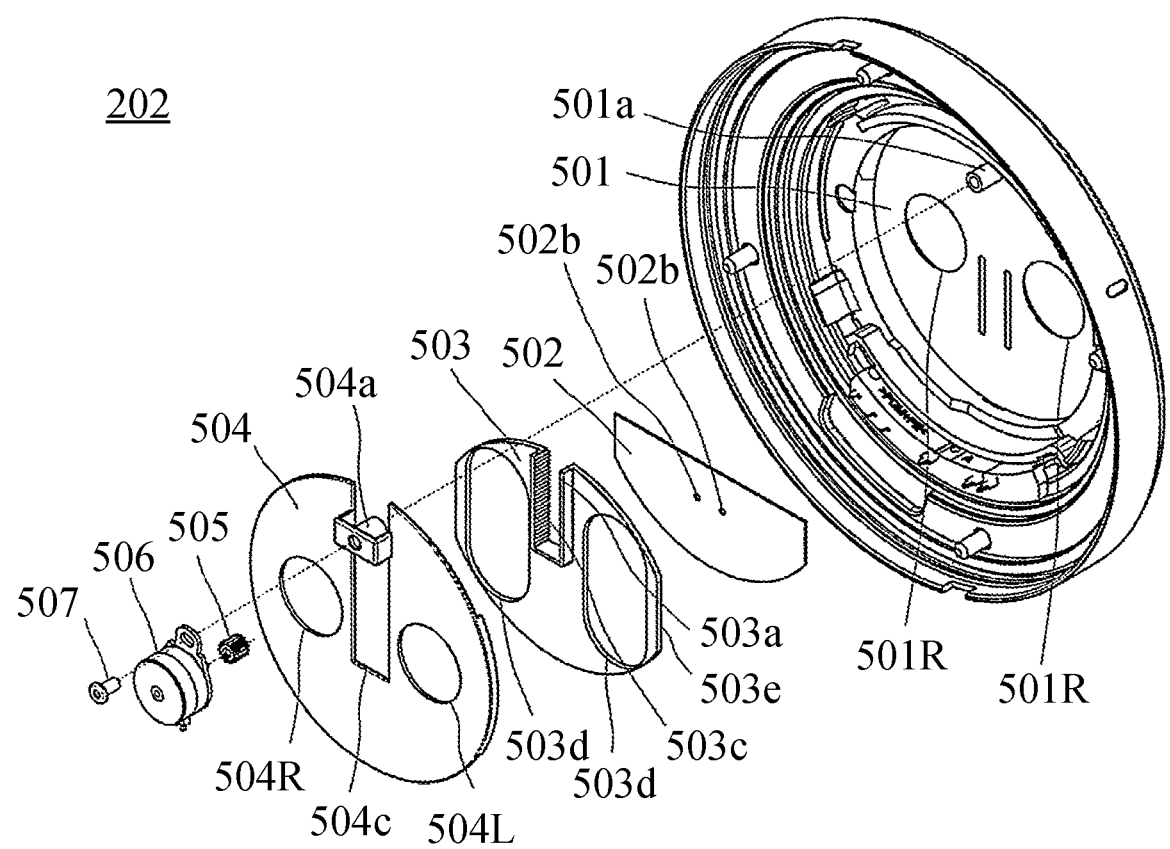
FIG. 19 is an exploded perspective view of a lens mount according to a third embodiment viewed from the object side.
Figure 20:
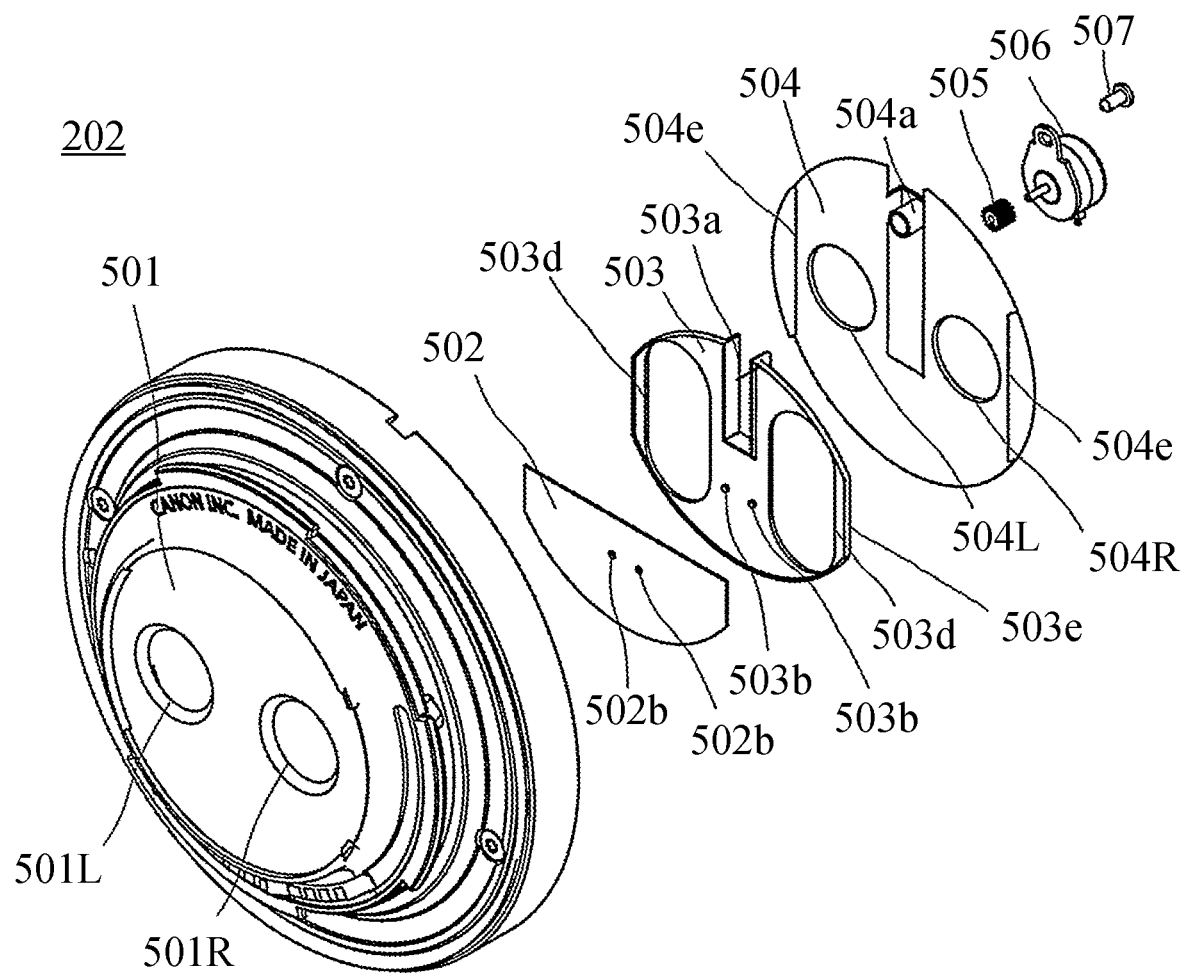
FIG. 20 is an exploded perspective view of the lens mount according to the third embodiment viewed from the imaging plane side.
Figure 21:
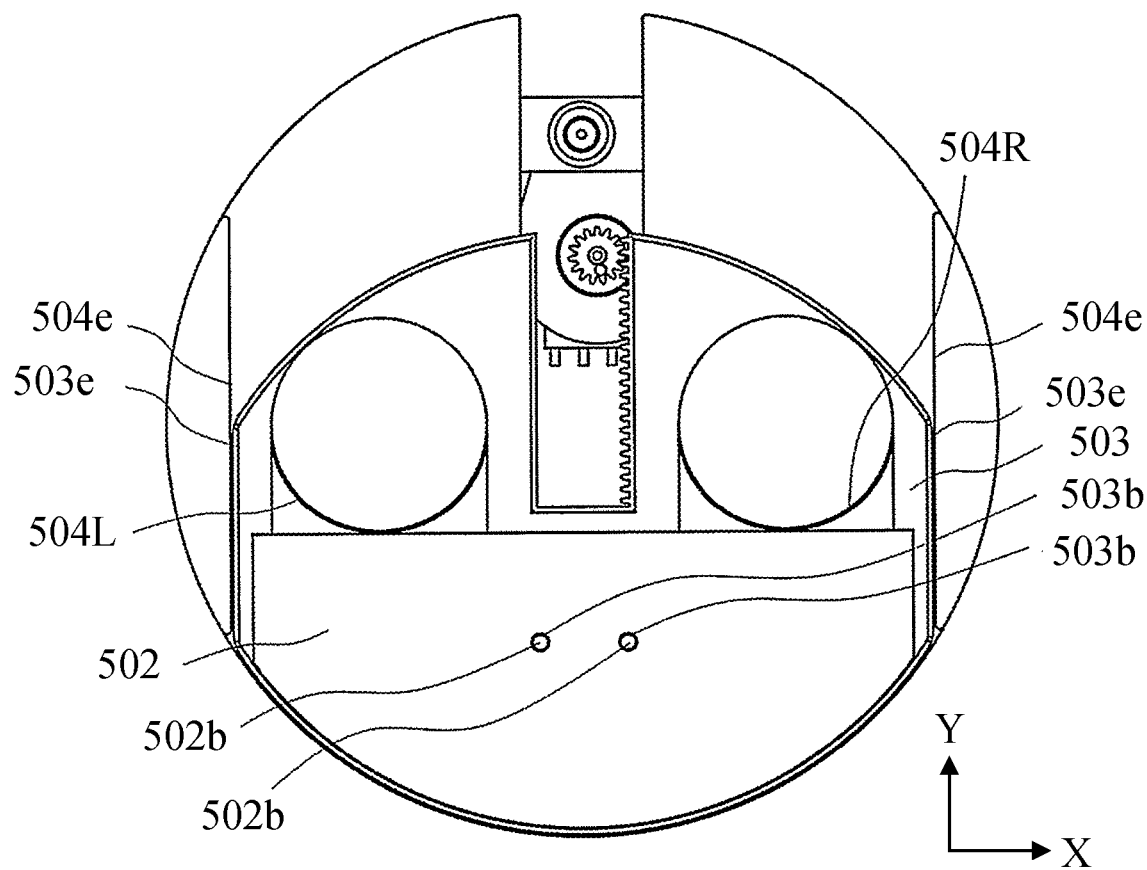
FIG. 21 is a rear view of the lens mount according to the third embodiment after the filter is retracted.
Figure 22:
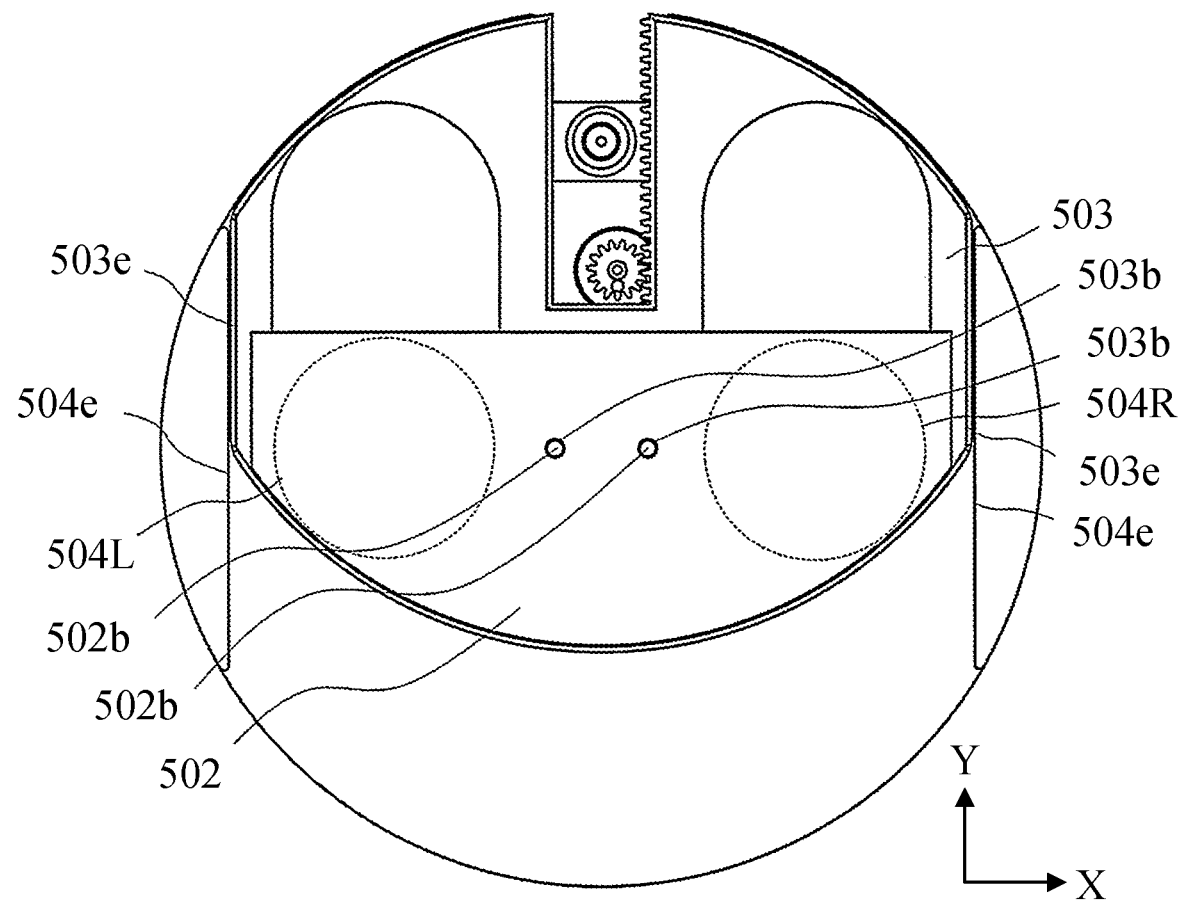
FIG. 22 is a rear view of the lens mount according to the third embodiment after the filter is inserted.

This embodiment will discuss a configuration of the lens mount 202 different from that of each of the first and second embodiments. FIG. 19 is an exploded perspective view of the lens mount 202 viewed from the object side. FIG. 20 is an exploded perspective view of the lens mount 202 viewed from the imaging plane side. FIG. 21 is a rear view of the lens mount 202 after the filter is retracted. FIG. 22 is a rear view of the lens mount 202 after the filter is inserted. This embodiment will discuss only a configuration different from that of each of the first and second embodiments, and will omit a detailed description of the common configuration.

The lens mount 202 includes a mount cover 501, a filter (filter member) 502, a translation member 503, a cover member 504, a gear 505, a motor (driving unit) 506, and a screw 507.

The mount cover 501 has a right-eye opening 501R corresponding to the right-eye optical system 201R and a left-eye opening 501L corresponding to the left-eye optical system 201L. The mount cover 501 further includes a motor fixing portion 501a. The motor 506 is fixed to the motor fixing portion 501a with the screw 507 on the object side of the filter 502.

The translation member 503 includes an elongated hole portion 503a, projection portions 503b, a power transmission portion 503c, opening portions 503d, and linear guide portions 503e. The elongated hole portion 503a is formed so as not to interfere with the motor fixing portion 501a. The gear 505 attached to an output shaft of the motor 506 is engaged with a rack gear formed on the power transmission portion 503c, so that the translation member 503 translates in accordance with the driving of the motor 506. The translation member 503 moves while the linear guide portions 503e contacts linear guide portions 504e provided on the cover member 504. The translation member 503 is movable in a direction orthogonal to a direction parallel to a line segment connecting the centers of the right-eye opening 504R and the left-eye opening 504L provided in the cover member 504, in which the translation member 503 is restricted from moving in a direction.

The cover member 504 includes a right-eye opening (first opening) 504R, a left-eye opening (second opening) 504L, an engagement portion 504a, and a penetration hole portion 504c. The right-eye opening 504R and the left-eye opening 504L correspond to the right-eye optical system 201R and the left-eye optical system 201L, respectively, and are formed at positions overlapping the right-eye opening 401R and the left-eye opening 401L in the mount cover 501. The cover member 504 is fixed to the mount cover 501 because the engagement portion 504a is engaged with the motor fixing portion 501a. An inner bottom surface of the engagement portion 504a and an upper surface of the motor fixing portion 501a contact each other, so that the cover member 504 is engaged with the mount cover 501 while a gap is formed between them. Therefore, the translation member 503 is fixed in the optical axis direction, and is sandwiched between the mount cover 501 and the cover member 504 movably in the direction orthogonal to the direction connecting the centers of the right-eye opening 504R and the left-eye opening 504L. The penetration hole portion 504c is formed so as not to interfere with the power transmission portion 503c.

The filter 502 is held by the translation member 503 because the projection portions 503b provided on the translation member 503 are engaged with holes 502b provided in the central portion. The filter 502 is disposed so as to close part of the openings 503d. Since the filter 502 is vertically movable in this embodiment, it is long in the horizontal direction and short in the vertical direction. The filter 502 is movable between a first state (state illustrated in FIG. 21) in which the filter 502 is retracted from the right-eye opening 504R and left-eye opening 504L provided in the cover member 504, and a second state (state illustrated in FIG. 22) in which the filter 502 is inserted into the right-eye opening 504R and left-eye opening 504L.

In a case where the motor 506 is driven while the filter 502 is in the first state, the filter 502 and the translation member 503 is integrally moved in a +Y direction. Thereby, the filter 502 is simultaneously retracted from the right-eye opening 504R and the left-eye opening 504L and enters the second state. In a case where the motor 506 is driven while the filter 502 is in the second state, the filter 502 and the translation member 503 is integrally moved in a −Y direction. Thereby, the filter 502 is simultaneously inserted into the right-eye opening 504R and the left-eye opening 504L, and enters the second state. Here, "simultaneously" includes not only exactly the same timing but also substantially the same timing (approximately the same timing). Thus, the configuration according to this embodiment can simultaneously retract the filter 502 from or insert the filter 502 into the two openings having different phases.

Although the translation member 503 is moved by motor driving in this embodiment, it may be moved by manually operating an operating member for operating the translation member 503.

Each embodiment can provide a lens mount that enables the filter to be simultaneously retracted from and inserted into two openings.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-046371, filed on Mar. 23, 2022, which is hereby incorporated by reference herein in its entirety.

What is claimed is:

1. A lens mount configured to enable a lens apparatus that includes a first optical system and a second optical system to be attached to and detached from an image pickup apparatus, the lens mount comprising:
   a cover member having a first opening for the first optical system and a second opening for the second optical system;
   a filter member movable between a first state in which the filter member retreats from the first opening and the second opening and a second state in which the filter member enters the first opening and the second opening, and
   a rotating member configured to hold the filter member and to be rotatable about a center of the lens mount,
   wherein the filter member becomes in the first state by simultaneously retreating from the first opening and the second opening, and becomes in the second state by simultaneously entering the first opening and the second opening, and
   wherein in a case where the rotating member is viewed from an optical axis direction, the rotating member has an opening that overlaps the filter member and an opening that does not overlap the filter member.

2. The lens mount according to claim 1, wherein the filter member is rotatable by 90 degrees.

3. A lens mount configured to enable a lens apparatus that includes a first optical system and a second optical system to be attached to and detached from an image pickup apparatus, the lens mount comprising:

a cover member having a first opening for the first optical system and a second opening for the second optical system; and a filter member movable between a first state in which the filter member retreats from the first opening and the second opening and a second state in which the filter member enters the first opening and the second opening, wherein the filter member becomes in the first state by simultaneously retreating from the first opening and the second opening, and becomes in the second state by simultaneously entering the first opening and the second opening, wherein the filter member includes:

a first filter member configured to retreat from the first opening in the first state and to enter the first opening in the second state; and a second filter member configured to retreat from the second opening in the first state and to enter the second opening in the second state, wherein the first filter member is rotatable about a first rotation center, and wherein the second filter member is rotatable about a second rotation center different from the first rotation center.

4. The lens mount according to claim 3, further comprising a rotating member rotatable about a center of the lens mount as a rotation center, wherein the first filter member and the second filter member each have a first cam groove and a second cam groove that are engaged with the rotating member.

5. The lens mount according to claim 1, further comprising a driving unit disposed on an object side of the filter member and configured to move the filter member.

6. A lens apparatus comprising:

a first optical system;

a second optical system; and a lens mount configured to enable a lens apparatus to be attached to and detached from an image pickup apparatus, wherein the lens mount includes:

a cover member having a first opening for the first optical system and a second opening for the second optical system;

a filter member movable between a first state in which the filter member retreats from the first opening and the second opening and a second state in which the filter member enters the first opening and the second opening, and a rotating member configured to hold the filter member and to be rotatable about a center of the lens mount, wherein the filter member becomes in the first state by simultaneously retreating from the first opening and the second opening, and becomes in the second state by simultaneously entering the first opening and the second opening, and wherein in a case where the rotating member is viewed from an optical axis direction, the rotating member has an opening that overlaps the filter member and an opening that does not overlap the filter member.

7. A lens apparatus comprising:

a first optical system;

a second optical system; and a lens mount configured to enable a lens apparatus to be attached to and detached from an image pickup apparatus, wherein the lens mount includes:

a cover member having a first opening for the first optical system and a second opening for the second optical system; and a filter member movable between a first state in which the filter member retreats from the first opening and the second opening and a second state in which the filter member enters the first opening and the second opening, and wherein the filter member becomes in the first state by simultaneously retreating from the first opening and the second opening, and becomes in the second state by simultaneously entering the first opening and the second opening, wherein the filter member includes:

a first filter member configured to retreat from the first opening in the first state and to enter the first opening in the second state; and a second filter member configured to retreat from the second opening in the first state and to enter the second opening in the second state, wherein the first filter member is rotatable about a first rotation center, and wherein the second filter member is rotatable about a second rotation center different from the first rotation center.

* * * * *